(12) United States Patent
Levieux

(10) Patent No.: US 9,922,408 B2
(45) Date of Patent: Mar. 20, 2018

(54) IMAGE FILTER

(71) Applicant: Yooshr, Ltd., London (GB)

(72) Inventor: Philippe Levieux, London (GB)

(73) Assignee: YOOSHR, LTD, London (GB)

( * ) Notice: Subject to any disclaimer, the term of this patent is extended or adjusted under 35 U.S.C. 154(b) by 0 days.

(21) Appl. No.: 15/225,481

(22) Filed: Aug. 1, 2016

(65) Prior Publication Data

US 2017/0032505 A1 Feb. 2, 2017

Related U.S. Application Data

(60) Provisional application No. 62/200,049, filed on Aug. 2, 2015.

(51) Int. Cl.
*G06T 5/00* (2006.01)
*G06T 5/20* (2006.01)
*G06T 11/60* (2006.01)
*G01S 19/13* (2010.01)

(52) U.S. Cl.
CPC ............... *G06T 5/20* (2013.01); *G01S 19/13* (2013.01); *G06T 11/60* (2013.01)

(58) Field of Classification Search
USPC .......................................................... 382/260
See application file for complete search history.

(56) References Cited

U.S. PATENT DOCUMENTS

| 9,697,623 | B1 * | 7/2017 | Yang | G06T 11/003 |
| 2016/0042526 | A1 * | 2/2016 | Lee | H04N 5/23216 348/351 |
| 2016/0267634 | A1 * | 9/2016 | Nam | G06T 11/60 |
| 2017/0039704 | A1 * | 2/2017 | Kasmi | G06T 7/0012 |
| 2017/0064097 | A1 * | 3/2017 | Yamamoto | H03K 19/17748 |
| 2017/0236239 | A1 * | 8/2017 | Reed | G06T 1/0028 |
| 2017/0244962 | A1 * | 8/2017 | Roskowski | H04N 19/102 |

* cited by examiner

*Primary Examiner* — Jerome Grant, II
(74) *Attorney, Agent, or Firm* — Procopio, Cory, Hargreaves & Savitch LLP

(57) ABSTRACT

A computer implemented method is provided that includes generating a spatial filter spectrum that includes a plurality of filters, receiving an input via an interaction device, and performing an operation on the spatial filter spectrum based on the received input, to apply a new filter in the plurality of filters of the spatial filter spectrum.

20 Claims, 26 Drawing Sheets

1000

IMAGE FILTER

The present application claims the benefit of priority under 35 USC 119(e) based on U.S. provisional patent application No. 62/200,049, filed on Aug. 2, 2015, the contents of which is incorporated herein in its entirety by reference.

BACKGROUND

Field

Aspects of the example implementations relate to a real-time filter for images, and more specifically, to filter images on mobile in real-time with seamless user interaction.

Related Background

Photo Filtering is the focal feature of online mobile applications involving photography. Related art photo-sharing platforms and social networks that allow users to upload or share photos include a feature that permits user to filter the photos.

For related art organizations, the photo filtering is critical to successful market efforts. For example, Instagram (acquired by Facebook 2012)—the largest photography-related social network and valued at $35 billion (2015)—succeeded at least in part due to its related art curated filters. Twitter recently (2015) added a related art filter feature when sharing a picture though the platform. Related art photo filters are available in the native camera app on iOS.

Despite the near ubiquity of related art filter features in existing online photography applications, there are very few points of differentiation in the type of filtering enabled and the user interface deployed for filtering. The related art applications, platforms, social networks and operating systems allow the user to choose a preset filter from a limited and discrete group of filter options—usually by sliding across to view the pre-set filters, and selecting a filter by tapping on a button representing the filter. Changing or modifying the pre-set filter, where that functionality is enabled, requires a number of additional taps. The process of adding a filter after taking a photograph is difficult for the user, because it is lengthy and is a post-production process. Thus, adding a filter after taking the photograph, as is required in the related art schemes, can interrupt the flow of a user who wishes to take additional photographs, often in close temporal sequence.

Additionally, related art online applications do not permit the filter to be parametrized. Thus, the choices available to the user are rigid and narrow. Despite the desire of users to use filters distinguish their pictures from the crowd, the majority of the photos shared on related art social networks and platforms are created using a small set of identical, pre-set filters.

In the related art, the filter is applied after the image has been captured in a post-processing manner. This related art method is time-consuming, as it requires the user to spend time after taking the picture to select and apply the right filter, often scrolling through multiple (e.g., more than 10) options before making a choice. In the related art native camera app of iOS 7.0, 8.0 and 9.0, Apple allows the user to select between 8 pre-set filters that can be applied to the camera view before capturing the picture. However, these filters cannot be parameterized, and require a two-tap action to be activated.

For the Photo & Video category of the Apple App Store (2015), about three quarters of the top paid applications in are mobile applications dedicated to photo filtering. Some related art applications are specialized—for example, to post-process images of faces (e.g., Facetune). However, most related art applications are generic (e.g., Pixelmator, Afterlight, Pixlr, Retrica), and are designed to filter any type of image in a post-processing process. The Android market, which is second in terms of mobile app downloads (2015), mirrors the Apple App Store with a lack of differentiation between Photo & Video applications in both filtering options and user interface design.

Related art software products for desktop computers (e.g., Adobe Photoshop, AfterEffects, Lightroom, Gimp) are targeted to professional or prosumer users. These related art software products often require months of training to master, and allow users to post-process their images & videos with hundreds of different filters and parameters. This is a tedious and time-consuming process for the user, even for the professional photographer. Some vendors have attempted to offer cut-down mobile-friendly application versions of their desktop software. However, these related art efforts have failed to replicate the desktop experience in a mobile environment, and have not met the demands of the "on the go" mobile user. These related art solutions remain in the professional post-production category and suitable for desktop use alone.

There is an unmet need for social networks or dedicated applications to provide a way to filter images on mobile in real-time with seamless user interaction, enabling a near infinite number of possible filters to be presented.

SUMMARY

Aspects of the example implementations relate to systems and methods associated with a computer implemented method that includes generating a spatial filter spectrum that includes a plurality of filters, receiving an input via an interaction device (e.g., client device), and performing an operation on the spatial filter spectrum based on the received input, to apply a new filter in the plurality of filters of the spatial filter spectrum.

Further, the example implementations may include a device configured to generate a new filter in a spatial filter spectrum, the device comprising a spectrum manager that generates the spatial filter spectrum having a prescribed geometry, the spatial filter spectrum comprising a plurality of geometrically arranged filters, a filter engine that generates the new filter based on information received via an interface, wherein the information comprises at least one of user-based information and not user based information and a rendering and output manager that generates an output by applying data associated with an image to the new filter to generate a rendered output of the image.

Optionally, the filter engine operates in real time and prior to the generating of the output by the rendering and output manager, so that the new filter is generated prior to a user event of capturing the image.

Further, the prescribed geometry may include at least one of a volumetric geometry that does not have a boundary, and a geometry that has the boundary and is subjected to a seamless interpolation operation.

It is an object of the example implementations to provide a photo filtering option that simultaneously:

Increases the choice of filters for users;

Provides a more seamless user experience when adding filters;

Removes the need to spend time post-processing photos; and/or

Allows any user without professional photo training knowledge to capture and/or edit a beautiful picture in a moment, while still enjoying the satisfactory feeling of being creative and producing something unique.

Thus, the example implementations are directed to real-time filtering of the camera input, so that a user may select and apply a filter before the image is taken. A filter spectrum is mapped spatially across the camera view in all directions. In the case of use with a touch-screen interface, the user may swipe across the camera view to apply the filter dynamically, changing it in real time according to the corresponding point in the spatial filter spectrum selected using touch. The user swipes and finds a correct filter for the shot, and then taps the interface to take the picture. In this way, choice for the user is increased exponentially with a seamless user experience, and the requirement for post-processing to add a filter is eliminated.

DETAILED DESCRIPTION

The subject matter described herein is taught by way of example implementations. Various details have been omitted for the sake of clarity and to avoid obscuring the subject matter. The examples shown below are directed to structures and functions for implementing systems and methods for exchange of information between users.

Aspects of the example implementations include, but are not limited to, a filter spectrum, the filters that compose the filter spectrum, a position inside the spectrum, and parameters that may change the position inside the filter spectrum. These elements are explained in greater detail as follows.

According to the example implementations, it should be noted that the exact type of filter, input data and output data can be determined and very without departing from the inventive scope, and is not limited to a specific filter, input data or output data. In other words, the example implementations are independent of type of filter, input data and output data. Thus those filters, input data and output data as would be known by those skilled in the art may be implemented herein, without departing from the inventive scope. Moreover, the spectrum is a conceptual map of filters that may have many shapes.

Figure 1:
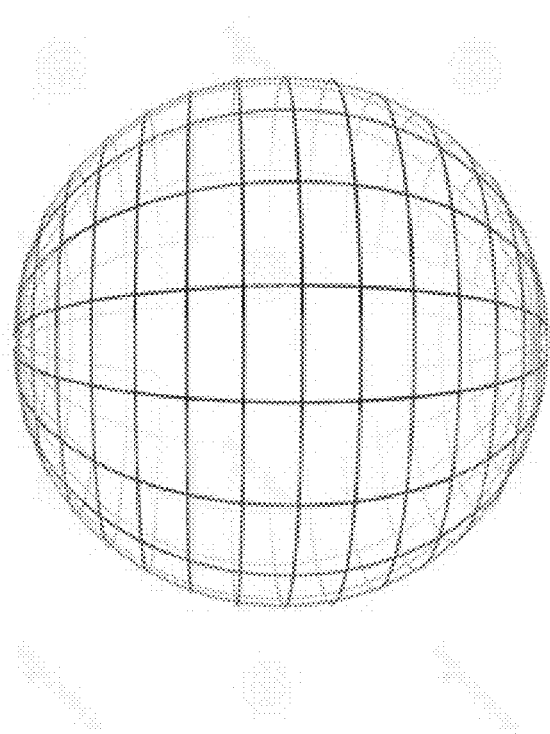
FIG. 1 illustrates a spectrum with a spherical shape according to an example implementation.

FIG. 1 illustrates a spectrum 100 according to an example implementation with a spherical shape.

Figure 2:
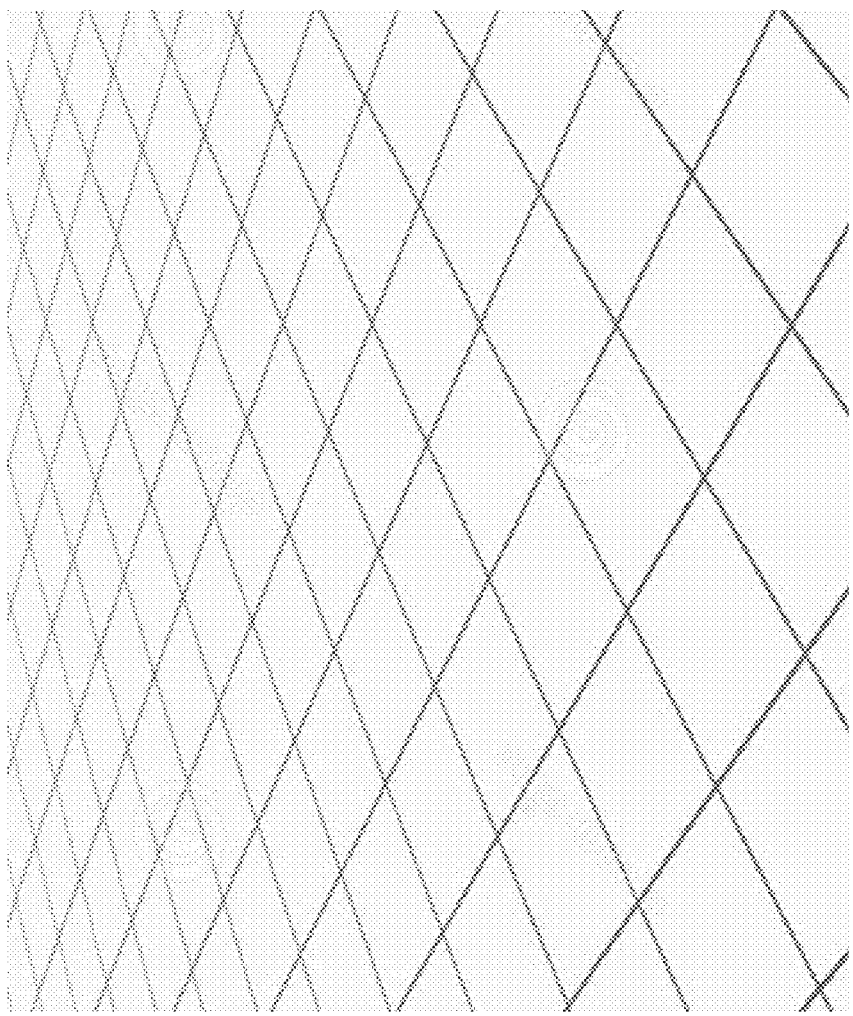
FIG. 2 illustrates a spectrum made of an infinite two-dimensional plane spectrum according to an example implementation.

FIG. 2 illustrates a spectrum 200 having an infinite two-dimensional plane spectrum according to an example implementation.

Figure 3:
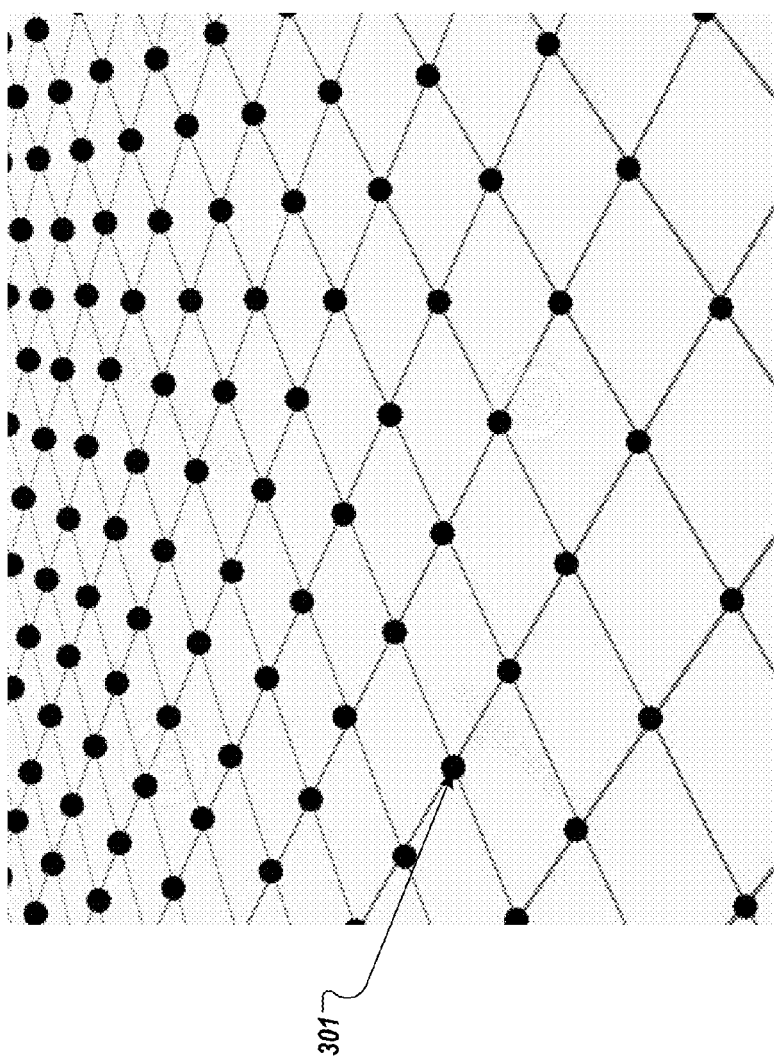
FIG. 3 illustrates the two-dimensional plane spectrum according to an example implementation, including line intersections highlighted with dots representing the filters.

FIG. 3 illustrates the two-dimensional plane 300 according to an example implementation. Further, line intersections of the two-dimensional plane include line intersections, identified by black dots 301. The black dots 301 represent the filters. Further, each of the black dots 301 is an independent filter with a spatial location.

Figure 4:
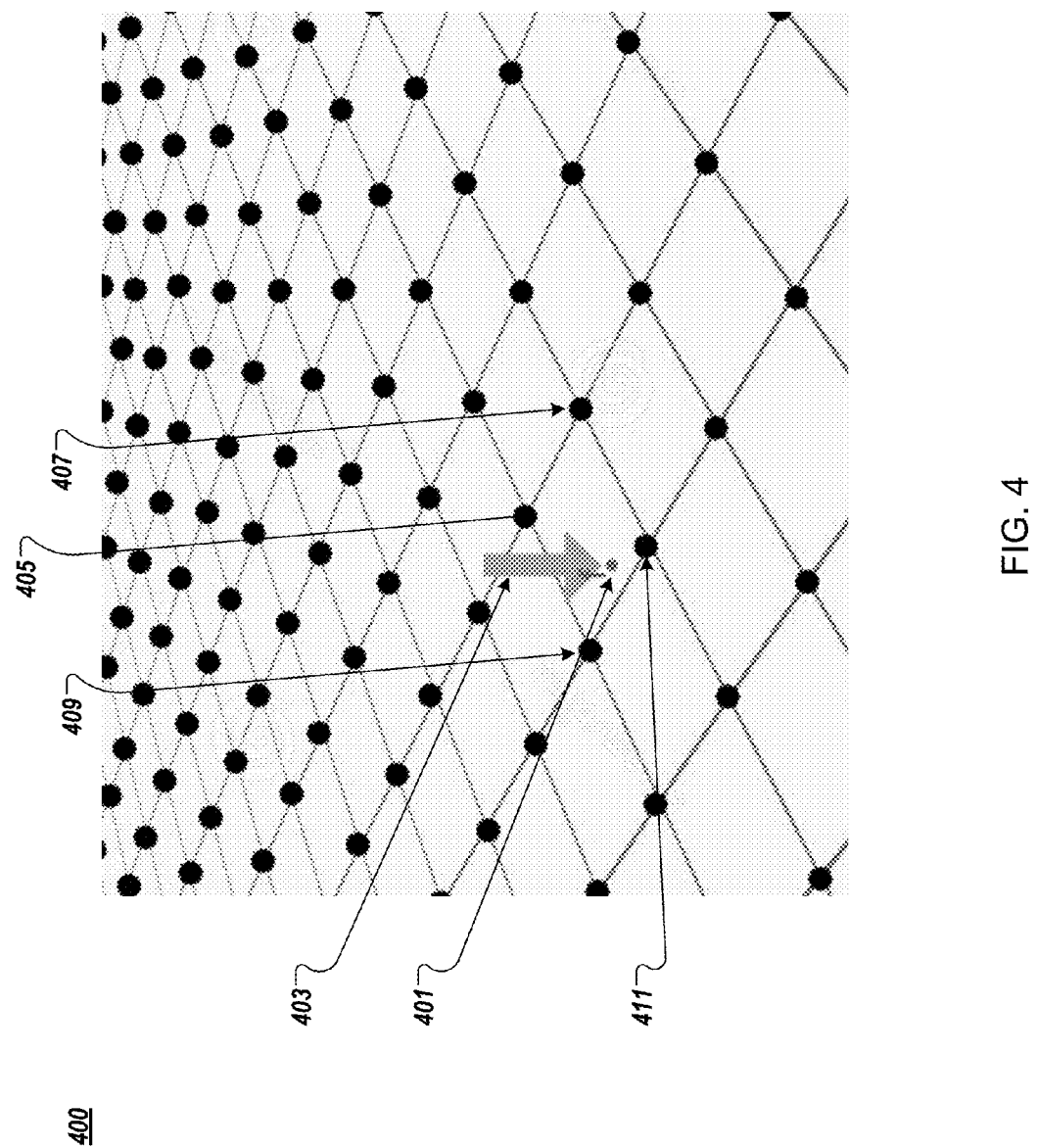
FIG. 4 illustrates the two-dimensional plane spectrum according to an example implementation, with a current position in the spectrum represented by the dot highlighted by the arrow.

FIG. 4 illustrates the two-dimensional plane spectrum 400 according to an example implementation, with a current position in the spectrum represented by the dot 401 (e.g., grey dot) highlighted by the arrow 403. This position 401 represents a filter f that will need to be generated in real time and in advance of the photo being taken, as will be explained below in greater detail. According to this example implementation, the position in the spectrum 401 does not correspond exactly with a given filter position. Accordingly, the four closest neighboring filters 405, 407, 409, 411 can be used to determine the final filter to be applied to the input data.

However, and as explained above, the configuration is not limited to the geometry shown in FIG. 4, and other geometries may be substituted therefor. For example, but not by way of limitation, if the spectrum was using two-dimensional triangular meshes, only three neighboring filters would be used to determine the final applied filter.

Figure 5:
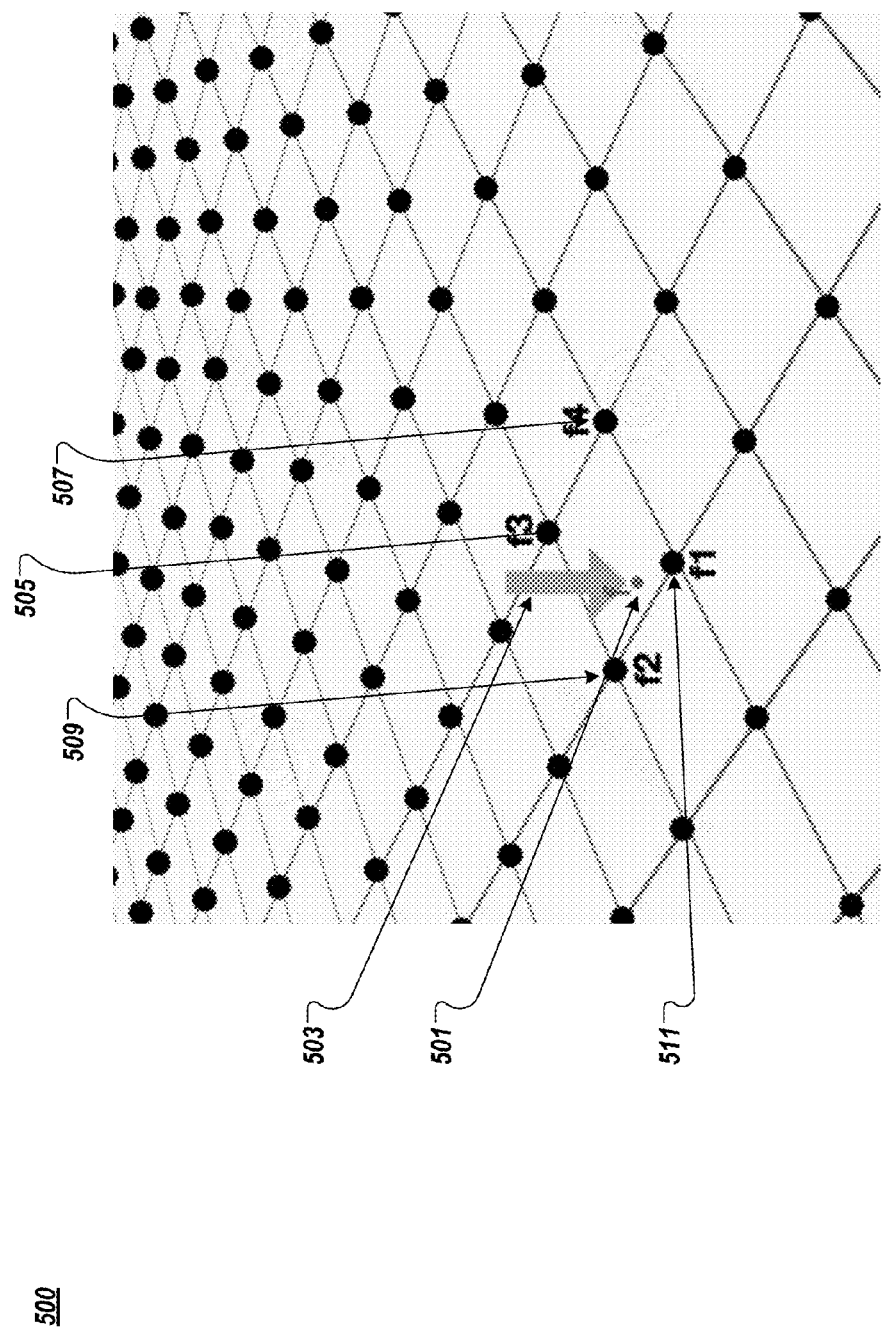
FIG. 5 illustrates the two-dimensional plane spectrum according to an example implementation, with neighboring filters f1, f2, f3 and f4 highlighted.

FIG. 5 illustrates the example implementation discussed above, with the position in the spectrum 501, as well as the neighboring filters 505, 507, 509 and 511 identified as f1, f2, f3 and f4, respectively. Accordingly, the nearest neighbor to the position in the spectrum 501 may be chosen and used as the filter. In this example implementation, the closest neighbor to the position in the spectrum 501 is filter f1, located at 511. This approach to calculating the filter is known as Nearest Neighbor Interpolation. Using this approach may create noticeable transitions while the user travels the spectrum.

Thus, and according to the example implementation, the user may travel the spectrum in a seamless manner. To accomplish this seamless movement within the filter spectrum, a technique of four-edges bi-linear interpolation or cubic interpolation is performed to obtain a smoother transition between filters 505, 507, 509, 511, i.e., f1, f2, f3 and f4, which are interpolated with regard to the current position, to create the filter f. When the current position changes, the filter f is re-computed, and can be applied to the input data in real-time.

Figure 6:
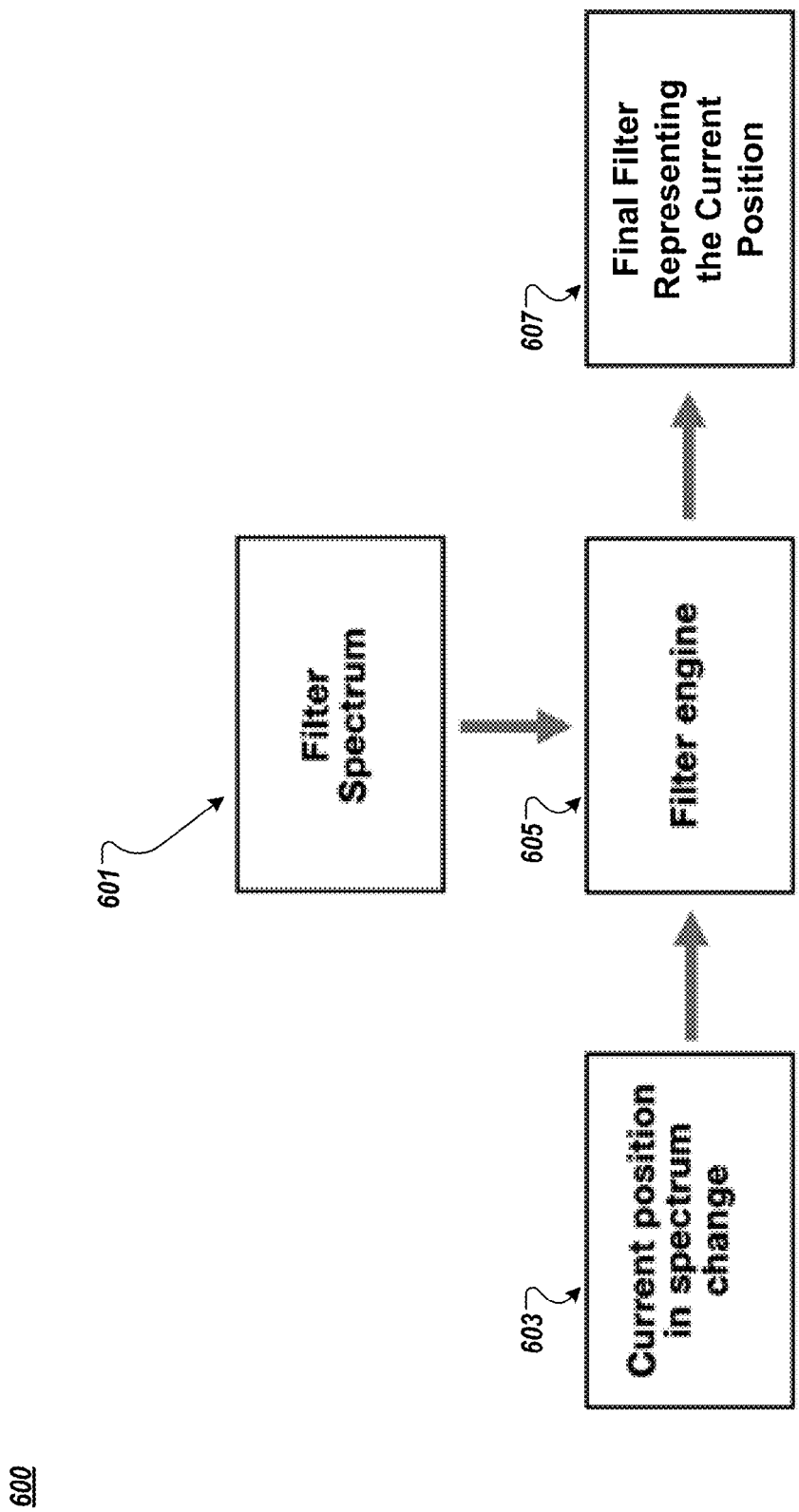
FIG. 6 illustrates a flow diagram according to an example implementation, showing the filter spectrum and current position inside the spectrum being used by the filter engine, which performs the interpolation to generate the final filter.

FIG. 6 shows a flow diagram 600 explaining how the filter spectrum and current position inside the spectrum are used by the filter engine, which performs the interpolation to generate the final filter. This is repeated anytime the current position in the spectrum is altered.

More specifically, as shown in flow diagram 600, the filter spectrum 601, as well as a current position in the spectrum that is changed 603, are provided to the filter engine 605. The filter engine 605 performs operations as explained below, and a final filter 607 that represents the current position is provided as an output.

Figure 7:
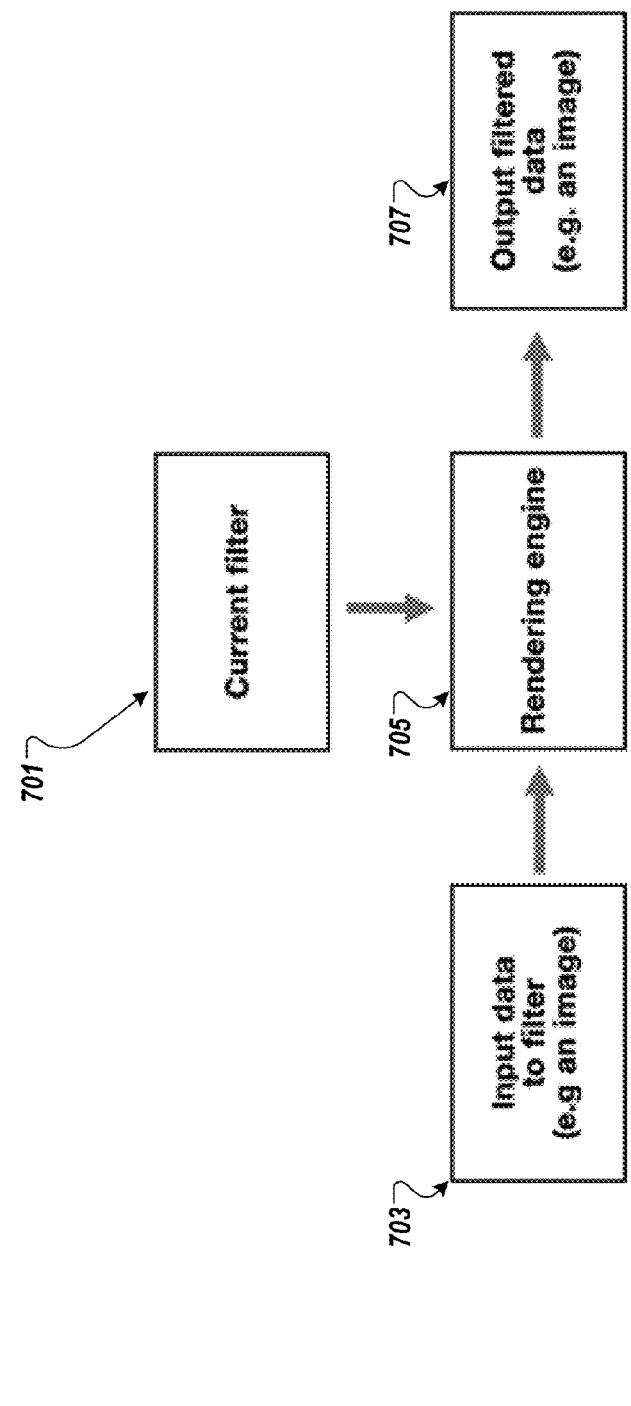
FIG. 7 illustrates a flow diagram showing according to an example implementation, showing the newly generated filter being applied to the input data by the rendering engine to output the filtered data.

FIG. 7 shows another flow diagram explaining how the newly generated filter that is the result of FIG. 6 is applied to the input data by the rendering engine to output the filtered data. This process would usually be repeated every time the current filter changes and/or new input data is available.

More specifically, at 700, the current filter 701, as well as the input data to the filter 703, is provided to a rendering engine 705. As explained below, the rendering engine 705 forms operations, to generate output filter data 707. For example, but not by way of limitation, the input data into the filter 703 may be an image. Accordingly, the output filter data 707 generated by the rendering engine 705 may be an image.

In the following disclosure, detailed descriptions of the filter spectrum operation are provided. These descriptions are provided for illustrative purposes. However, variations and modifications as would be understood by those skilled in the art may be included herein, without departing from the inventive scope.

The example implementation is directed to basing the filtering on a filter spectrum. The spectrum may be characterized as a grid or mesh (e.g., infinite) having a plurality of intersecting lines. Each of the intersections on the spectrum is a photo filter. However, many variations may be applied to the spectrum, as explained in greater detail below.

For the foregoing example implementations described herein, the spectrum must be created. A spectrum may be curated by a human or a machine. The spectrum can be generated offline and stored statically inside the software, hardware or online. The spectrum can be generated on the fly at run-time by the interface.

If the spectrum is generated by a machine for Photo & Video use cases using color transformations at random without the enforcement of any rules, the result would not be likely to produce a satisfactory output for human users, due to the inclusion of potentially unaesthetic filters. For example, but not by way of limitation, skin color might appear green and the sky might appear red. In regular landscape or portrait photography, such "unnatural" filters may not be desired by the general user. Therefore, and according to the example implementations, those fields are removed from the spatial filter spectrum. On the other hand, in certain photography contexts where such fields may be applied, an example implementation which presents only "Warhol" style neon filters might be customized and presented as a feature for those users.

Constraints may be applied during spectrum generation. For example, in one example implementation, it might be required that all neighboring filters must be very different from one another, so that the user will perceive large differences in the output when travelling across the spectrum. In an alternative example implementation, it might be required that the neighboring filters must be very similar to one another, to deliver a subtle transition. Such variations in the design of filter neighborhoods and adjacent filters may be designed as would be understood by those skilled in the art to meet the needs of the user.

According to the example implementations, the same filter may be used several times in the same spectrum, since it will be generating totally different new filters when being interpolated with its neighbors at run-time. To prevent perceptible repetition, this example implementation would need to set a rule that if filters are being repeated, then the filters are not to be repeated with the same neighbor in the spectrum. The assignment of appearance odds to the filters may be performed, so the ones that are more extreme and un-natural appear less frequently in the spectrum than the more naturalistic ones.

In some example implementations, the user may not be aware of the rules, or determine these rules governing the spectrum. In other example implementations, the user might be prompted to specify what type of filter is desired, and those specifications may be used to govern the creation of the spectrum. Thus, the user may be able to provide input to customize the creation of the spectrum according to the desires of the user.

In addition to user based inputs, the parameters used to generate the spectrum may also be external factors, such as time, temperature, date, weather conditions, GPS coordinates, seasons, elevation, etc., as well as events or time of year.

Further, the spectrum can also be generated or tweaked through manual curation of the filters.

Machine Learning is a key element in the filter creation. By using machine learning, it is possible to optimize the filter spectrum based on data to suit the user. Data on user preference, both individual and across the user base, is relevant in such a learning process. Other data points might, for example, include user preference data on desired filters at different times of the day, different location, seasons or filters preferred by gender, age, nationality or any other combination of user data points. Using machine learning, individual user preferences can be adduced and predicted and applied to optimize the filter spectrum in real-time. The learning capabilities presented by spatial filter spectrum generation are significant.

The spectrum may be composed of a set of filters but can also be composed of extra information. For example, but not by way of limitation, each filter may be classified or associated with keywords, GPS coordinates, or have a name. This extra information may be useful when a more complex system is created, such as one that commands the position inside the spectrum using speech or other type of data such as emotion recognition. While a spectrum can be extremely simple and created in seconds, some types of the spectrum may be generated using complex data-sets and advanced learning techniques.

For the forgoing spectrum, the spatial filter spectrum can be represented in many ways. It can be finite with borders (e.g. a cube); it can be finite with no borders (e.g. a sphere); or, it can be infinite (e.g. a plane or line). The concept of infinity is abstract and not always possible to process computationally, so techniques can be applied to virtually "fake" infinity in the filter spectrum or at least give the impression of infinite filters to the user.

For example, but not by way of limitation, example spectrums shapes classified through the number of dimensions that compose the spectrum may include:
1 dimension: (i.e. a line)
2 dimensions: (i.e. a plane)
3 dimensions: (i.e. a cube, sphere, etc.)
N dimensions: Additional dimensions such as time, altitude, location, weather data, events, etc. can also be part of the equation that defines the shape of the filter.

The filter spectrum may in some examples be finite and have borders. However, according to the example implementations, the user may be provided with the impression of an infinite spectrum.

As a simple example implementation, a filter spectrum may be mapped around the surface of a sphere. Whichever direction the user navigates across the sphere's surface and the filter spectrum, they will never reach a border.

Figure 8:
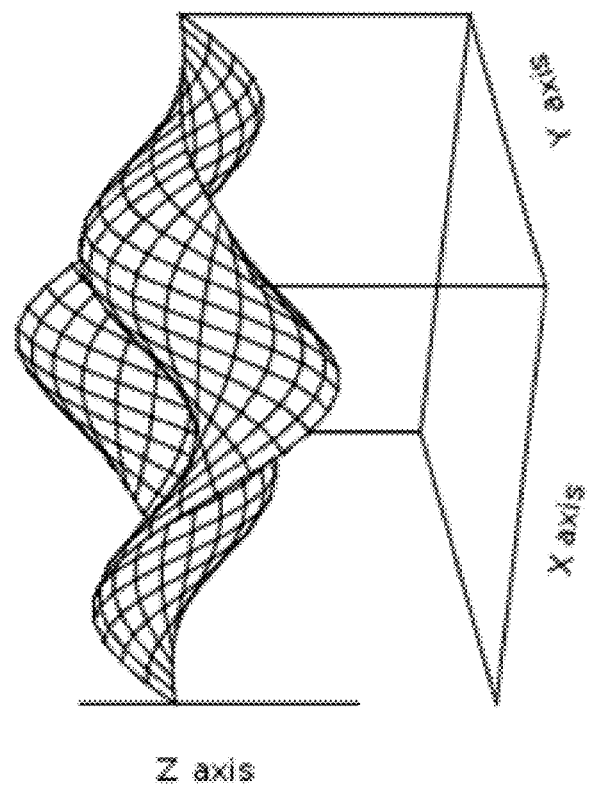
FIG. 8 shows other types of surface, volume, objects made of meshes used as a shape for the spectrum according to an example implementation.

Also, on other types of surfaces, volume, objects made of meshes can be used as a shape for the spectrum, as shown in FIG. 8. More specifically, FIG. 8 illustrates a mesh having a three-dimensional surface in the x axis, y-axis and z-axis.

Figure 9:
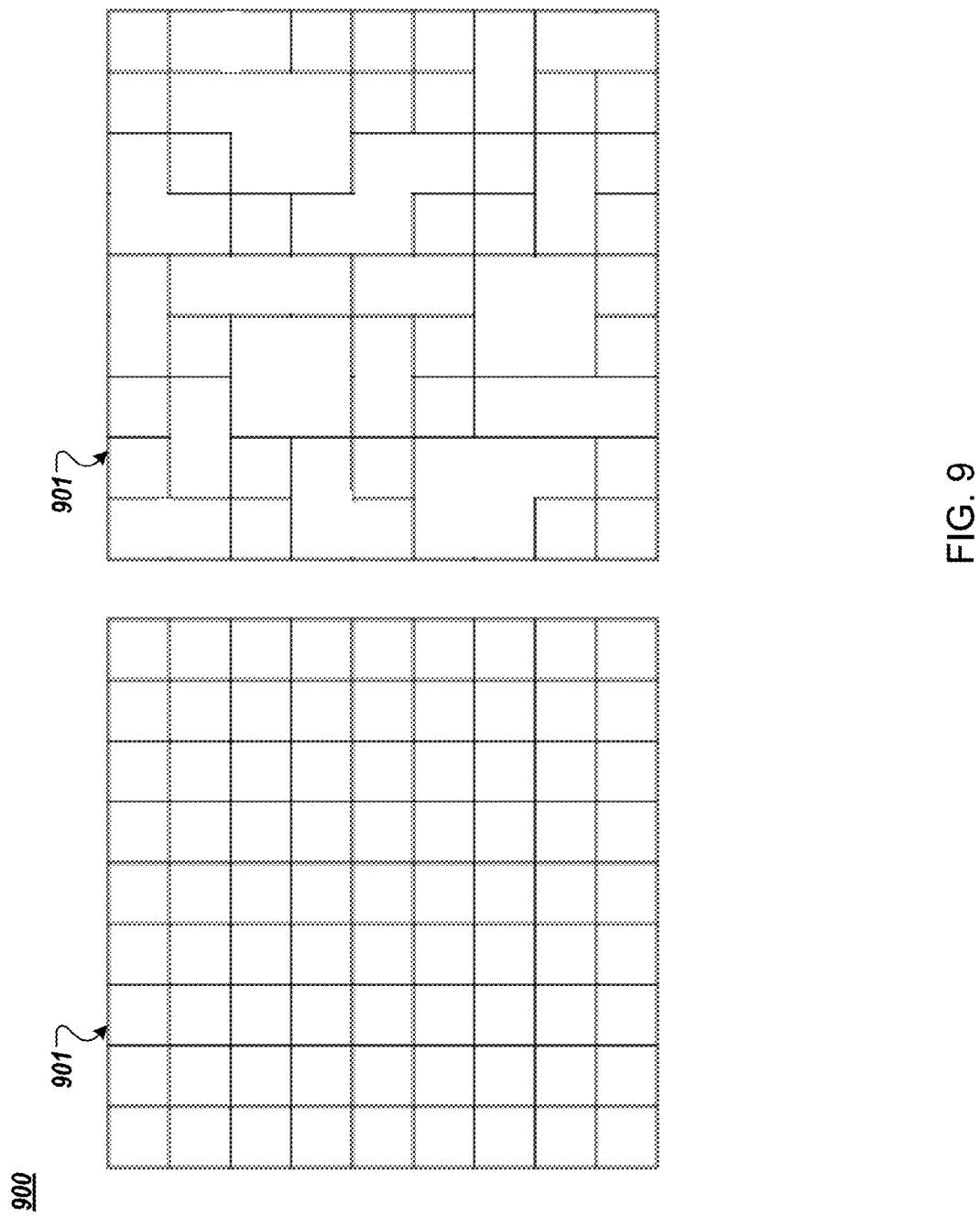
FIG. 9 shows a regular spectrum and an irregular spectrum according to the example implementation.

Further, the spectrum need not be regular. For example, as shown in FIG. 9, a regular spectrum 901 and the regular spectrum 903 are provided. The spectrum is in essence a map. The same analogies can be made to city maps; while New York is very uniform, Paris is not. New York has some significant 3D in its landscape, while Manchester, England does not.

The spectrum may be static and remain unchanged after creation. Alternatively, the spectrum may also be dynamic and be re-arranged over time. This can be done without the user's knowledge to avoid a perception of repetition (e.g., by machine using the above-disclosed learning techniques), or via user interaction. One example implementation is a full re-arrangement of the spectrum being triggered by the user shaking their mobile device or by some other action or data input. However, the example implementation is not limited thereto, and any other trigger as would be understood by those skilled in the art, as well as other actions than a full rearrangement, can be substituted therefor without departing from the inventive scope.

If the spectrum is large enough, a user will not perceive any repeating pattern of the filter, especially if the spectrum is truly infinite. It is possible to generate (e.g., fake) this effect with a spectrum of any shape by interpolating between borders, allowing for the smooth transition from one side of the spectrum to another.

An extra global parameter may be applied to the spectrum, to prevent users from perceiving repetition. For example, but not by way of limitation, the entire spectrum may be subject to a parameter such as time, which would constantly alter the filter contained in the spectrum (e.g., time may vary the saturation or brightness of the filters). Different timescales can be applied, from changing every second to every season; from grayscale at night to color during the day; from grayscale in winter to color in summer, etc.

These parameters may be subject to location, since time and season differ according to region. Other such types of parameters can be greatly nonlinear and unpredictable, such as the ambient temperature around the device or at the device GPS location; warm temperature adds a warmer color filter (reds), while a colder environment shows colder color filters (blues).

A dynamic spectrum may also be employed to prevent noticeable repetition. The spectrum can re-arrange itself to increase the number of variations, and lower the risk of variation being perceived because of a user action or through an independent factor; for example, the spectrum could be rearranged at set intervals, such as every 60 seconds.

According to an additional example implementation, filtering in real-time the camera feed may be perceived as a variation of Augmented-Reality (AR). For example, but not by way of limitation, this AR approach may be used in conjunction with a Virtual Reality (VR) Headset (e.g., Oculus Drift), thus allowing the user to physically experience and travel the spectrum in real-time while wearing the headset, and providing a fully immersive filtering experience.

Traveling across spectrum is also a technique that can be used to avoid repetition, as explained below. In some example implementations, repetition may be an objective, and may be implemented at the initial spectrum generation stage.

More specifically, a user need not be satisfied with a single filter spectrum, as it is possible for a user to have many spectra. According to various example implementations, a user may change, travel or otherwise move from one spectrum to another spectrum, which may be associated with one or more use-cases.

Spectrum can be classified: vintage spectrum, black & white spectrum, summer-time spectrum, warhol spectrum. A user may enjoy changing spectrum to apply a filter of their chosen spectrum to the image. In this way, "families" of filters can be selected, navigated and applied.

Travelling from one spectrum may be a spatial transition where the user navigates to a boundary or gateway of a spectrum and into another spectrum. An analogy might be a physical gateway into another dimension.

Spectrum does not need to be a discrete operation. Through interpolation between the current filter and the entry point filter in the next spectrum, the transition may be made to appear seamless and made imperceptible by the user. Again, the same techniques as described may be used to blend the transitions between spectrums so as to create the impression for the user of infinite filter possibilities.

Alternatively, another use case may require a distinct transition. In a gamified implementation for example, the different spectrums could be associated with levels of a game or portals between games. This feature can be implemented in many ways: a user could unlock another spectrum by achieving a task, through an action such as liking a social media page, or by purchasing access to the additional spectrum. The existence of these additional spectrums can be made known to the user or left for the user to discover in an Easter-egg hunt type of feature.

In an example implementation using panning on a touch-screen to change the filter position, the user could pan to a given point in the spectrum, where the spectrum automatically changes into another spectrum. The user would be transported to another spectrum. This might represent the transition between an optimized color spectrum as described above to a black and white or inverted spectrum, for example. The user may be able to transition back and forth between spectrums, or travel between spectrums may be set to be only one way.

Another example implementation might be location-based, with the user being physically in a particular location or region and that GPS coordinate unlocking the transition to another spectrum. A use case may be the transition to a special spectrum whenever the user enters into the location of an attraction park (e.g., Disney). In this way, the attraction park is able to curate an "exclusive" filter for all the people in their park and the images taken there.

Travel across spectrum can also be seen as an evolution. A filter spectrum could start with a saturation of 0, basically a grayscale spectrum, and evolve towards a spectrum of full saturation. In an example implementation, this could happen due to external parameters such as the time of day—for example with midnight being grayscale and midday being full saturation. Each level of saturation would be another spectrum. In another example implementation, the evolution may occur due to user action which can be achieved through purchase, an action on social media or some other parameter. In this way, a user's field of spectrums can evolve—an analogy would be like a video game character (e.g., Pokémon) evolving during its life, subject to various experiences and achievements.

A further disclosure of traveling within the spectrum is provided as follows, according to the example implementations. The filter that will be applied to the input image is determined by the current position inside the filter spectrum. How the user inputs the position or how any other input is factored determines the position inside the spectrum.

In some example implementations, the user may quickly travel through a large portion of the spectrum by, for example, swiping a touchscreen with their finger. However, sometimes the user may only be able to explore a small portion of the spectrum; an example would be when the spectrum is mapped to specific GPS coordinate. In other example implementations, travel inside the spectrum may be rendered impossible (e.g. when the position is determined by the user's DNA sequence or other non-variable input).

In other example implementations, travel inside the spectrum is smooth and continuous so the user gets a seamless experience. In still other example implementations, jumps inside the spectrum can be made. Further, hybrid versions that allow continuous and jump travel may be implemented.

Examples of inputs which can be used to dictate travel within the spectrum are provided as follows.

In some example implementations, the user may be triggering changes to the current position inside the spectrum.

For example, but not by way of limitation, touch or gesture (pan, swipe, pinch, tap, long press etc.) on a touchscreen/tactile device may be used to trigger changes. These gesture-based movements may also work on any projected, hologram-based devices.

Further, a device motion such as a shake may be employed, as well as information coming from device sensors such as gyroscope, accelerometer, magnetometer, these information can come from the device on which the software runs (e.g., a mobile phone) or from an extension of that device such as a smart-watch, where the watch would act as a remote control for the application.

Additionally, speech recognition and dictation can be used to dictate the position inside the filter spectrum. A user could simply ask the software for a "vintage filter"; a filter that meets these criteria will be found inside the spectrum. Alternatively, the user might use recognizable voice commands such as "keep panning left/right" to travel the spectrum.

Increasingly, devices are being used to collect user-data; for example, smart watches, glasses, wearable devices, automotive devices and mobile phones. These devices may record user's biometric information such as distance walked, heart beat or stress levels. In one possible example implementation, such user-generated data can be used to determine the position inside the spectrum, making it possible for example to adapt filters dynamically to a user's activity, health or sense of wellbeing. For example, the heartbeat of a user can in this way determine the filter applied to a selfie. This novel approach also opens up the potential for therapeutic applications of the present filter spectrum in the healthcare and wellbeing market where users may benefit from augmenting their visual or audio environment automatically based on their activity, their biometric indicators or other parameters.

In some example implementations, the user's GPS location can be mapped to a location on the spectrum. For example, may be provided spectrum which perfectly maps the planet Earth. At a defined scale, every GPS location will be associated to a filter and whenever the user moves to a new GPS point, the position within the spectrum will change to the corresponding filter. The same spatial principle applies to example implementations which utilize location in games or simulations.

In some example implementations, the information that will be filtrated can define the position and motion inside the spectrum.

In an example implementation that is treating live video, the optical flow inside the current image sequence can be computed and utilized to determine travel within the spectrum. If the stream shows a still landscape, for example, the motion inside the spectrum will be small. Motion inside the spectrum will speed up if the video stream is showing cars racing around a track.

In some example implementations, the current scene being filtered is analyzed to determine which position in the spectrum will give the best result. This can be done by looking at some color information such as the average image color, brightness or through some more meaningful analysis such as content identification, emotion classifier, face detection or recognition. For example, if the filters in the spectrum have been classified, a filter classified as 'happy' could be applied to a picture in which people smiling. A filter classified as 'sad' can be applied to a picture of people crying.

Further, unique input of the user may be provided. For example, everybody has a unique DNA sequence, fingerprint and iris scan. Unique biometric identifiers such as these can be used as parameters in the filter spectrum, enabling the creation of unique filters based on unique biometric identifiers. In such an example implementation, filters become unique identifiers for users. The filter spectrum can in this way also be applied to any unique identifier such as a Car Registration, Airplane Number, Building Address, IP address of a networked device, phone number, social security number, credit card number, bill serial number etc.

Additionally, global inputs in may be provided. Time also is a potential variable. Consider where a filter spectrum changes depending on time (for example, orange and red colors in summer, blue colors in winter, or different filters dynamically shifting throughout the twenty four hours of the day).

Further, third-party input may also be provided. Third parties may provide very important input for travelling the spectrum since the world is now fully connected made of mobile and distributed system.

In one example implementation, a third party device may film an aquarium containing fish; the position, speed and direction of the fishes would be calculated in real-time and used to present a filter in the spectrum. Any form of analysis of visual input can be used to determine the filter presented.

Another potential embodiment may use as an input signals such as Bluetooth and Bluetooth low energy. For example, a filter spectrum may automatically change depending on the proximity of an iBeacon. A spectrum could be made by laying out a grid of iBeacon in a physical location.

Input parameters used to travel the spectrum may be provided by third-party web-services such as online weather providers, stock options and other data points such as events (e.g., Super Bowl, Christmas, etc.). Similarly, for information coming from social networks (e.g., Facebook, Twitter), a user's previous browsing habits or keyword in user speech can likewise be used as input parameters.

The example implementations are not limited to selecting only one of the forgoing manners, and hybrid-spectrums based on several parameters are also feasible (e.g., a gesture on a touchscreen device which also takes the location of the user into account). The location can be part of the equation at all times, or only when the user is in a particular area (e.g., geo-fencing).

While the user is travelling across the spectrum, in some example implementations, the filtered data may be displayed back to the user in real-time giving the user direct feedback. Other type of feedback may also be given, including but not limited to:

Displaying a user-interface element at the position at which the user is touching the screen;

Displaying a full map of the spectrum (e.g. a sphere) showing the current position;

Displaying the name of the current filter if it has one; and

Playing another spectrum of media such as audio which can be generated using information from the spectrum; this way, the user would have another type of feedback.

As explained above, the spectrum is composed of filters. The following disclosure is directed to examples of filters that can be used in the foregoing example implementations. The main focus is filters that can apply to photo & video content. However, other example implementations related to audio or other type of signal is applicable. As explained above, the type of filter is not particularly limited, and any filter as would be understood by those skilled in the art may be applied.

Filters employed in the spectrum may be linear or non-linear. Further, simple and basic image processing techniques such as adjusting contrast and saturation which imply adjusting a single parameter with bounded range (e.g., 0 to 255) may be used.

In addition, a filter may be a combination of (a few or many) simple filters or parameters. Example of simple filters (common named) that can be used in our system are: brightness, contrast, saturation, exposure, highlights, shadows, clarify, fade, tone, temperature, vignette, grain, sharpening, levels, vibrancy, color balance, hue, white balance, false color, 2d transformation, 3d transformation, cropping, masking, gamma, haze, sepia, color invert, luminosity, low-pass, high-pass, laplacian etc. However, other, more complicated, completely non-linear combination of filters can be used in the spectrum: neon-glow, watercolor, Gaussian/box/bilateral/motion/zoom/median blur, any other type of blur, sketch effect, metal effect, glowing edges, mosaic, grain, pixelated, brush strokes, monochrome, segmentation, polka dot, halftone, crosshatch, sobel/prewitt/canny/threshold edge detection, derivative, harris/noble corner detection, shi-tomasi feature detection, hough transform, motion-detection, sketch, toon, tilt shift, chroma key, kuwahara, swirl, bulge, pinch, dilation, opening, closing, erosion, noise, perlin noise, voronoi, mosaic, binary pattern, add/divide/multiply/overlay/lighten/darken/color/saturation/soft blend, and any other type of blend. The forgoing lists of simple filters and complex filters are not intended to be limiting and are provided for explanatory purposes only; those skilled in the art would understand that other simple or complex filters may be added or substituted for the forgoing filters, without departing from the inventive scope.

Figure 10:
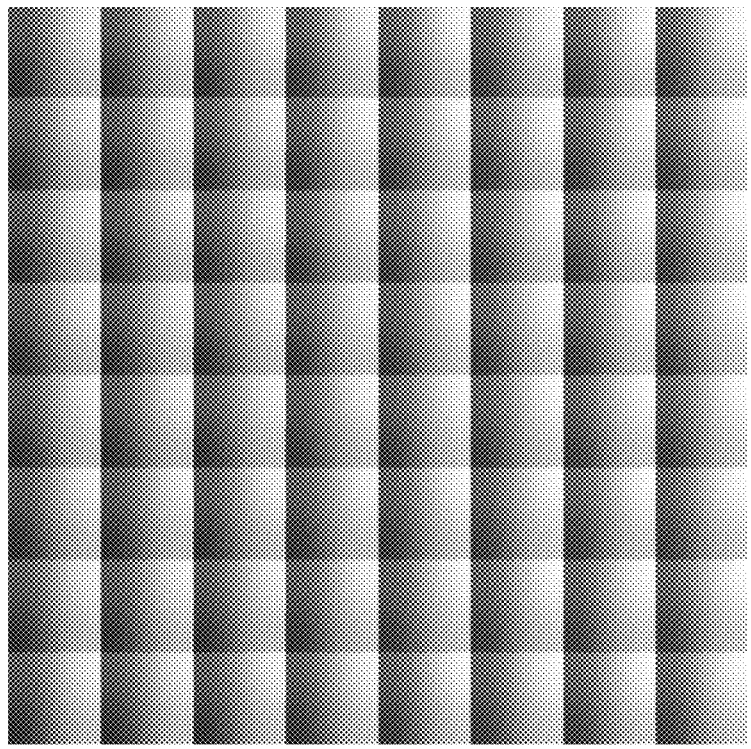
FIG. 10 shows a lookup table (LUT) that would product grey-scale images, according to the example implementation.

Additionally, it is noted that a filter in the spectrum may be a combination of any photo filters. One example implementation can be used with a color transformation filter based on a Lookup Table (LUT). For example, a LUT of size of 512×512 is composed of 262,144 elements, which are each composed of three channels (RGB). The number of parameters is then 786,432 which could have a range composed of 256 discrete values each (0 to 255). A virtually infinite spectrum may be created with filters that are composed of many parameters. FIG. 10 represents a LUT 1000 that produces grey-scale images. In some example implementations, the 2D lookup tables are represented as a 3D cube called three-dimensional color lookup table (CLUT or Color Cube). Instead of being 512×512, they are 64×64×64. The dimension of the LUT or CLUT can vary, e.g. a CLUT can be 8×8×8 and will yield to a highly segmented image.

In another example implementation, instead of lookup table, the filter spectrum could be composed of tone curve (.acv file). Other functions and structures may be substituted therefor without departing from the inventive scope, as would be understood by those skilled in the art.

Further, an aspect of the example implementations involves ownership and sharing. An additional feature could be to map the individual value of a spectrum (e.g., spherical) filter and allow users to name, acquire or own these as propriety points in the filter-spectrum—in much the same way as astronomers map and name celestial objects.

In an example implementation, the user can assign a filter to a position in the spectrum. While in another spectrum, the user simply takes ownership of a discovered position in the spectrum by naming it or paying for it. This ownership might be triggered by an action such as capturing a picture.

In another example implementation, a filter may be shared by a user with others inside an application or via social platforms, such as Facebook, URL link, QR code, or other sharing means. Sharing can be used in many ways: a spectrum can be shared, the position inside a spectrum can be shared, the filter generated by a spectrum can be shared, the input data as filtered can be shared. This information can be shared and stored in different way both locally or online. In some example implementations, information regarding the spectrum, filter, position will be stored inside the filtered image's metadata. In others, this information can be shared through a URL, QR code or simple string of text. Any type of encoding, XML, JSON, encrypted way can be used over these information. Sharing can also occur via file transfer.

Sharing can also be done in a more social manner by creating a social media network based around the filters and spectrum. The social network need not be about the media itself. The feed can be composed of filtered media shared by other users; any user may have the opportunity to apply the same filter to their own media.

While ownership of a filter can be acquired and shared by a user, in another example implementation, the ownership might be attributed to other factors—such as for example the GPS coordinates at which the picture has been taken. Users might also be able to associate a filter to a GPS coordinate or to a name, therefore allowing a user to generate the spectrum and name the filter at a particular location. This data can then be re-used as it is or in a learning process to improve and derive a filter for another user in the same location at some point in the future.

This type of ownership can be done in the background without the user been aware of the process happening or be an active feature of the app.

Another aspect of ownership may be related to the application of overlays within filters. Overlays can be any image or sound or user experience additional to the filter and linked to it. An example implementation might include the ability to link advertising-related content to filters for presentation to the user as they migrate across various points in the filter spectrum. In this way, visitors at a themepark (e.g., Disney)—thanks to their GPS location and a geofencing parameter—might be able to unlock filters with a logo (e.g., Disney), stamp or similar brand message overlaid. In another application, image analysis can be used as a parameter, so for example all images containing smiles unlock a filter overlay from a brand. An advertising model may be structured around spatial filter spectrums to enable companies, organizations or individuals to "sponsor" or acquire individual filter positions in the spectrum for the overlay of their content.

The foregoing example implementations may be applied on various devices and data. For example, the spatial filter spectrum may be applied to a device that utilizes a screen, viewer or interface, projected screen, hologram or tactile panel and any range of input including touch, audio, through eye movement or gesture-based input. Example devices today are mobile phones, tablets, cameras, laptops, projectors, wearable-devices including smart glasses, smart lenses, watches, interactive screens, virtual reality gaming devices and automotive screens. However, the example implementations are not limited thereto, and other devices may be substituted therefor without departing from the inventive scope.

Further, while the image input may include photography, it is not limited thereto, and other inputs may be substituted therefor within the scope of the example implementations. For example, in addition to photography, a further example implementation is in the field of live video stream. Users may apply the filter to the video recording in real-time. This example implementation can be applied to live stream platforms or applications such as WebRTC, Skype, Meerkat and Periscope.

While the foregoing example implementations may apply to image data, the above-described spatial filter spectrum may be applied to other types of data such as audio. In case of images, the color space and number of channels is referenced. It can be applied on RGB, BGRA, YUV, CMYK, gray-scale and any other type of image data. The number of bits per channel is not relevant. For example, an example implementation could be use with images captured and/or edited using a depth-of-field camera or an infrared camera.

Input and spectrum is not limited to a single type of data. Further, one could create a hybrid spectrum that would contain both information for image and audio which could generate sounds when travelling the spectrum or filter the audio being captured and/or edited with the input video stream.

Additionally, the present example implementations may be as explained to a camera feed in real time, thereby providing instant feedback to the user by displaying the filtered camera feed directly on the screen. Or in another the present example implementations may be applied as a post-processing step on pictures and video taken with other camera applications. Post-processing may also imply direct feedback to the user by displaying the image on the screen and may also mean real-time user interaction, as in the use-case of a photo editor software.

Further, filters may be computed in real-time or in the background as a slower task, using a GPU, CPU or any other type of processing unit.

Figure 11:
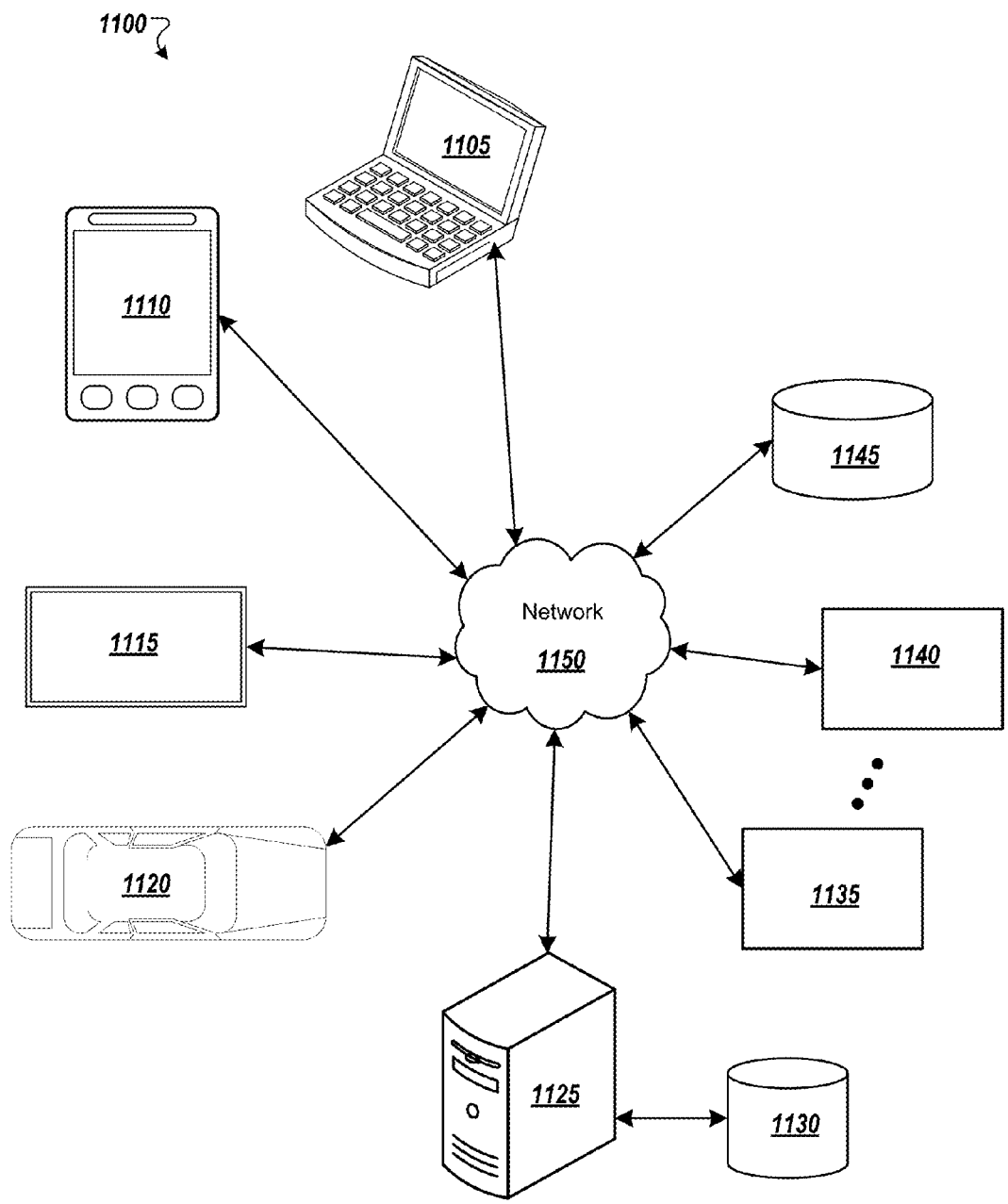
FIG. 11 shows an example environment suitable for some example implementations.

FIG. 11 shows an example environment suitable for some example implementations. Environment 1100 includes devices 1105-1145, and each is communicatively connected to at least one other device via, for example, network 1160 (e.g., by wired and/or wireless connections). Some devices may be communicatively connected to one or more storage devices 1130 and 1145.

An example of one or more devices 1105-1145 may be computing device 1205 described below in FIG. 12. Devices 1105-1145 may include, but are not limited to, a computer 1105 (e.g., a laptop computing device), a mobile device 1110 (e.g., smartphone or tablet), a television 1115, a device associated with a vehicle 1120, a server computer 1125, computing devices 1135-1140, storage devices 1130 and 1145.

In some implementations, devices 1105-1120 may be considered user devices, such as devices used by users. Devices 1125-1145 may be devices associated with service providers (e.g., used by service providers to provide services and/or store data, such as webpages, text, text portions, images, image portions, audios, audio segments, videos, video segments, and/or information thereabout).

For example, a user may access, view, and/or share content related to the foregoing example implementations using user device 1110 via one or more devices 1125-1145. Device 1110 may be running an application that implements information exchange, calculation/determination, and display generation.

Figure 12:
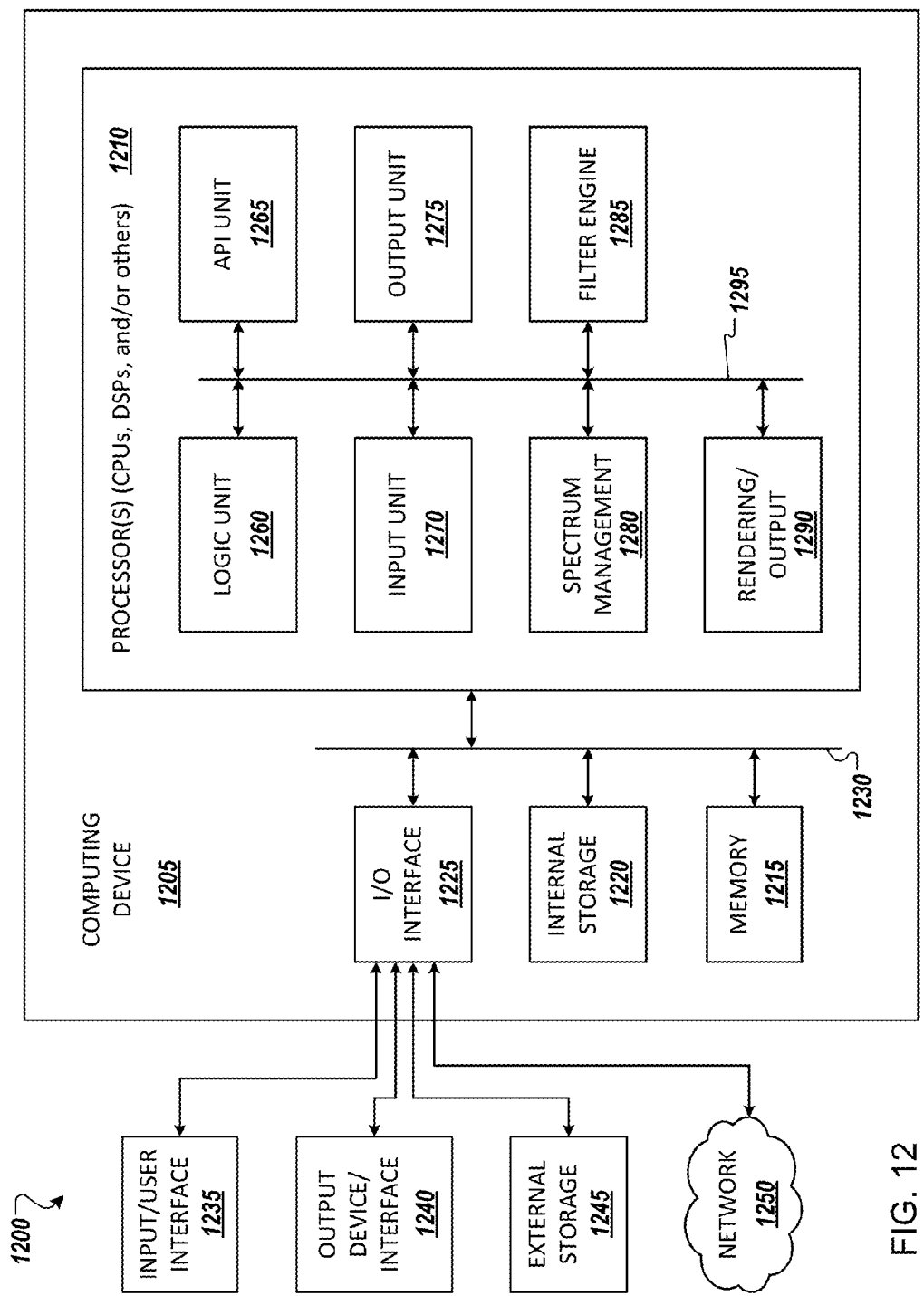
FIG. 12 shows an example computing environment with an example computing device suitable for use in some example implementations.

FIG. 12 shows an example computing environment with an example computing device suitable for use in some example implementations. Computing device 1205 in computing environment 1200 can include one or more processing units, cores, or processors 1210, memory 1215 (e.g., RAM, ROM, and/or the like), internal storage 1220 (e.g., magnetic, optical, solid state storage, and/or organic), and/or I/O interface 1225, any of which can be coupled on a communication mechanism or bus 1230 for communicating information or embedded in the computing device 1205.

Computing device 1205 can be communicatively coupled to input/user interface 1235 and output device/interface 1240. Either one or both of input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1240 may include a display, television, monitor, printer, speaker, braille, or the like. In some example implementations, input/user interface 1235 and output device/interface 1240 can be embedded with or physically coupled to the computing device 1205. In other example implementations, other computing devices may function as or provide the functions of input/user interface 1235 and output device/interface 1240 for a computing device 1205.

Examples of computing device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions, Smart-TV, with one or more processors embedded therein and/or coupled thereto, radios, and the like), as well as other devices designed for mobility (e.g., "wearable devices" such as glasses, jewelry, and watches).

Computing device 1205 can be communicatively coupled (e.g., via I/O interface 1225) to external storage 1245 and network 1250 for communicating with any number of networked components, devices, and systems, including one or more computing devices of the same or different configuration. Computing device 1205 or any connected computing device can be functioning as, providing services of, or referred to as a server, client, thin server, general machine, special-purpose machine, or another label.

I/O interface 1225 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computing device 1205 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, Objective-C, Swift, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, spectrum management 1280, filter engine 1285, rendering/output 1290, and inter-unit communication mechanism 1295 for the different units to communicate with each other, with the OS, and with other applications (not shown). For example, spectrum management 1280, filter engine 1285, and rendering/output 1290 may implement one or more processes described and shown in FIGS. 1-11. The described units and elements can be varied in design, function, configuration, or implementation and are not limited to the descriptions provided.

In some example implementations, when information or an execution instruction is received by API unit 1265, it may be communicated to one or more other units (e.g., logic unit 1260, input unit 1270, output unit 1275, spectrum management 1280, filter engine 1285, and rendering/output 1290). For example, after input unit 1270 has received an input according to any of FIGS. 1-11, spectrum management 1280 may create or modify the spectrum in response to the received input and provided a new or updated spectrum. Further, the filter engine 1285 may generate updated filter information based on a change in the spatial position of the user, or change in other information. Further, rendering/output 1290 may provide an output by performing processing on a selected filter based on the information of the filter engine 1285 in the context of the spectrum as managed by the spectrum management 1290. Input unit 1270 may then provide input (e.g., from a user or other source) related to an interaction with the display or user interface, or an input of information. Output unit 1275 then generates the output to the user (e.g., filter for image processing).

In some instances, logic unit 1260 may be configured to control the information flow among the units and direct the services provided by API unit 1265, input unit 1270, output unit 1275, spectrum management 1280, filter engine 1285, and rendering/output 1290 in some example implementations described above. For example, the flow of one or more processes or implementations may be controlled by logic unit 1260 alone or in conjunction with API unit 1265.

With respect to the foregoing example implementations, the following example use cases are provided. However, these use cases are not intended to be limited, and other variations and example use cases may be substituted therefor without departing from the inventive scope.

Figure 13:
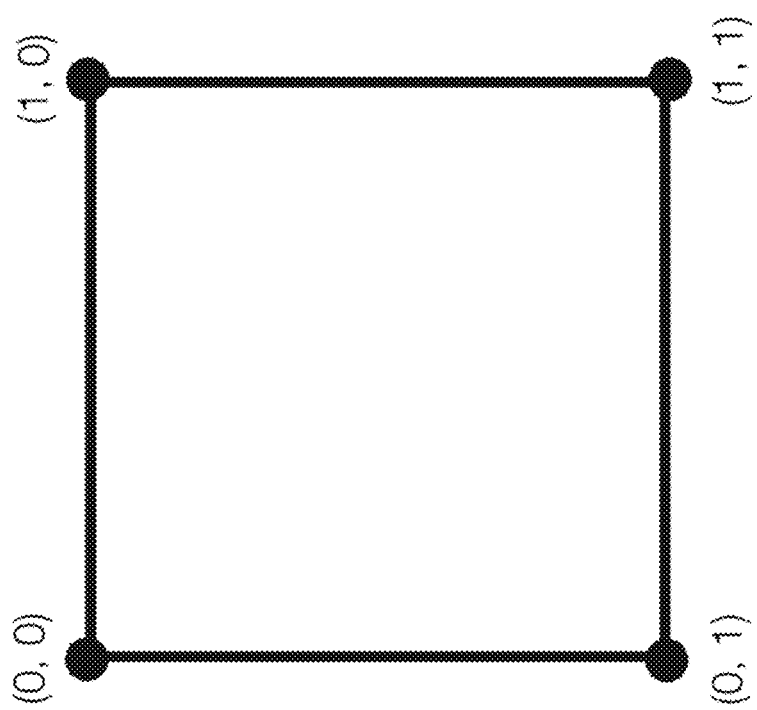
FIG. 13 illustrates a 2×2 grid according to an example implementation.

According to one example implementation, a filter spectrum is created. For example, but not by way of limitation, the filter spectrum may include is with a 2×2 grid which is made of 4 filters, one at each corner. This filter spectrum can be created and stored in memory when an online application is launched. The grid can be represented using an array, dictionary, or any other well-known data-structure or database, which would map the filter to grid coordinates. FIG. 13 illustrates the 2×2 grid. The top left corner is represented by coordinate 0, 0 while the bottom right is 1, 1. A simpler version of this spectrum may include lines defined by 2 points (e.g., 2 filters). However, the 2×2 grid can be extended into an infinite grid.

The application generates or chooses a filter per corner while the grid is being created; alternatively, the filter may be generated on the fly, when the user starts to travel the spectrum. The spectrum may be composed off-line and may be already stored on disk and loaded at launch. Further, the spectrum may be stored online and downloaded from the server at run-time.

Figure 14:
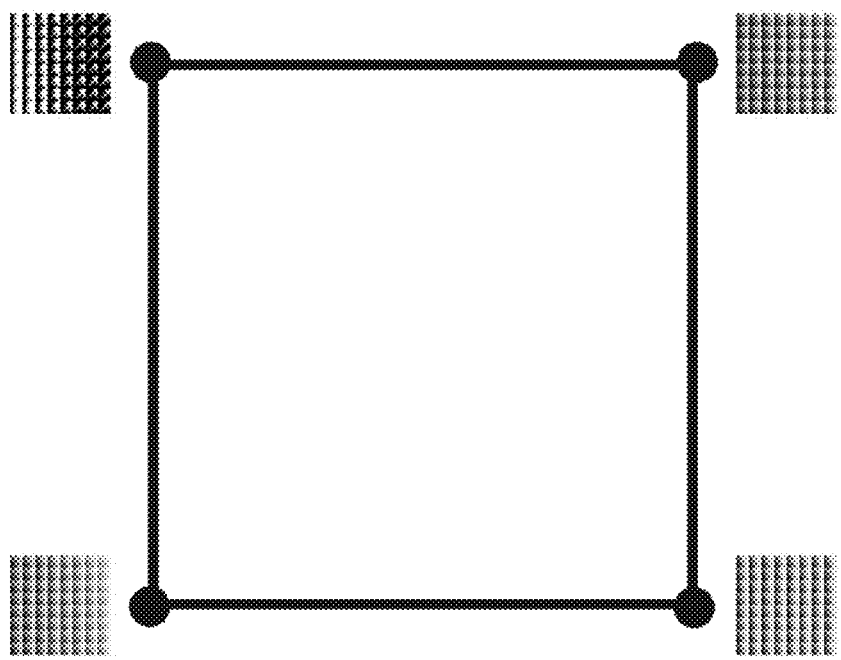
FIG. 14 illustrates an example lookup table which is an image associated to each corner of the 2×2 grid.

In the case of a filter spectrum that performs color transformation using a lookup table, a lookup table which is an image is associated to each corner may be provided as shown in FIG. 14.

Figure 15:
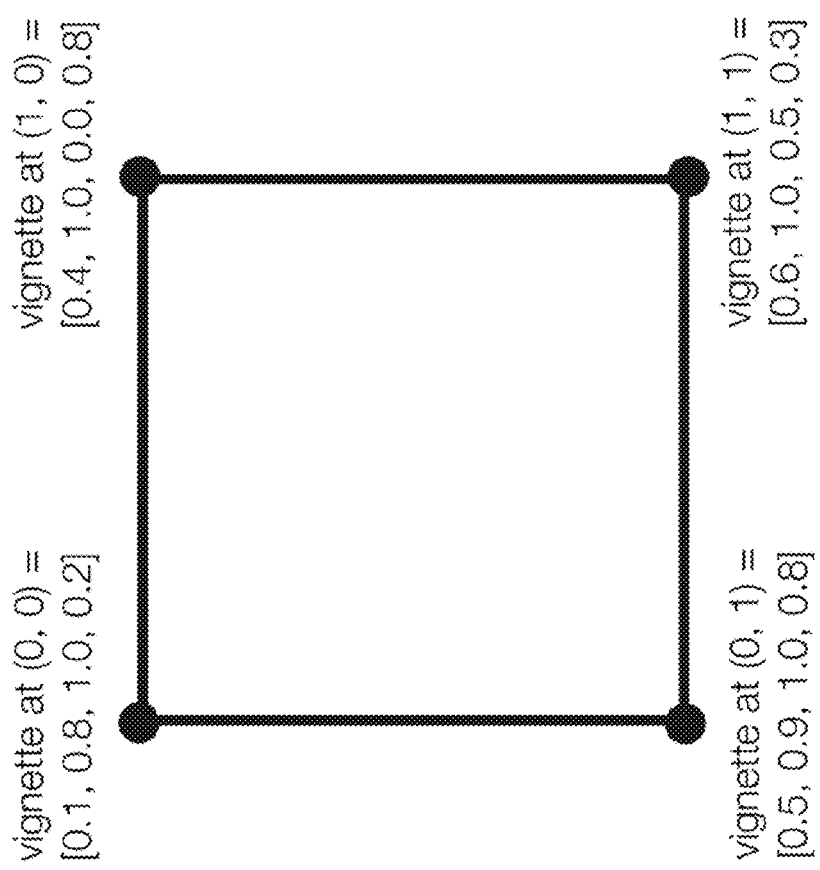
FIG. 15 shows an example spectrum.

For a filter spectrum that performs vignetting, a vignette is associated with each filter. A vignette can be defined using a few floating point values depending on the implementation. For example, the floating point values may represent the strength, start/end points and/or highlight. The vignette can be mathematically calculated at runtime using these values. FIG. 15 shows such an example spectrum.

Figure 16:
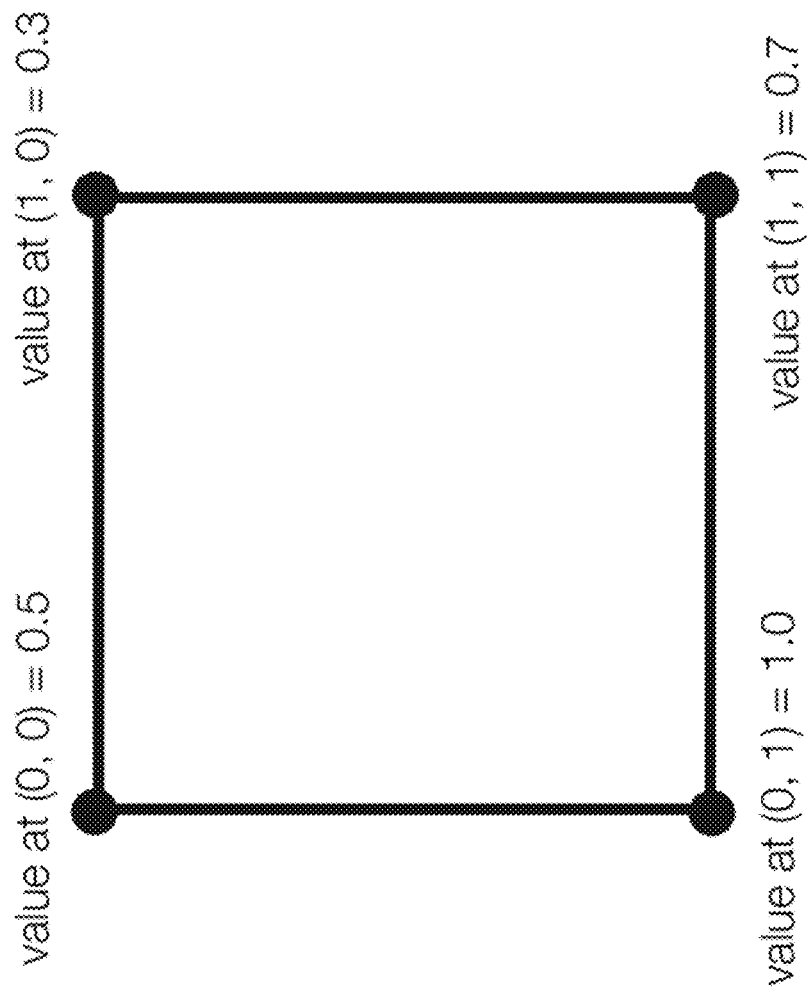
FIG. 16 shows a filter spectrum that alters the contrast such that each corner is associated with the intensity of the contrast.

In the case of a filter spectrum that alters the contrast, each corner is associated with a single value which is the intensity of the contrast, as shown in FIG. 16.

This contrast example is used in the following explication. However, this example can be applied using any type of filter, composed of multiple values such as the vignette (e.g., 4 values) or a large number of values such as the LUT. Each LUT is composed of 512×512 pixels× RGBA=1048576 values.

Figure 17:
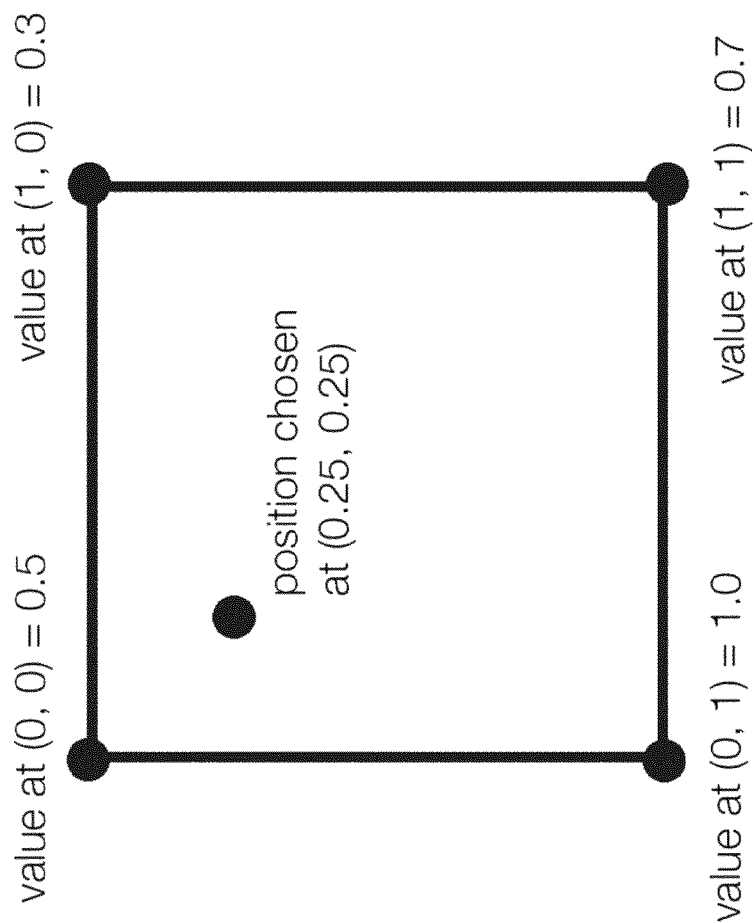
FIG. 17 shows the position of the user inside the spectrum according to an example implementation.

The current position in the spectrum may be chosen as follows. Once the spectrum has been created, the next step is to choose the current position inside the spectrum. There are many ways to do this, including but not limited to choosing a random position inside the grid, the user touching the screen to input a position, loading the position from persistence (e.g., the last position that the user had used), or the like. As shown in FIG. 17, the position of the user inside the spectrum is chosen at 0.25, 0.25.

Figure 18:
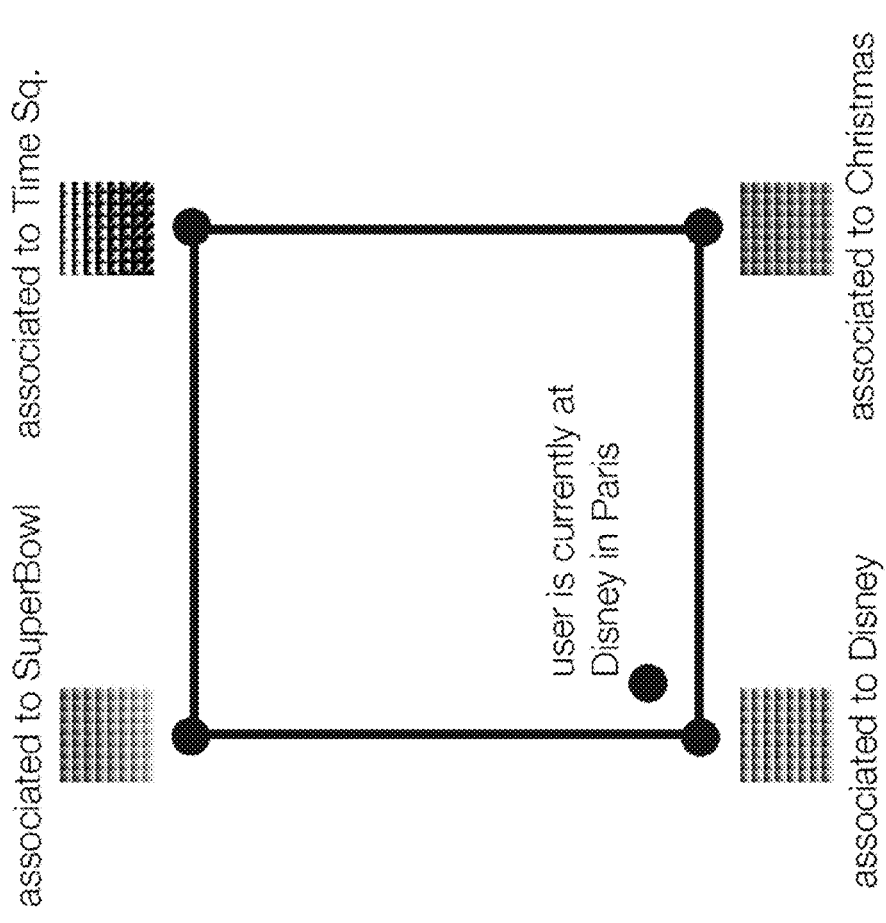
FIG. 18 shows a spectrum with 4 LUT filters, each of them associated with an external value, according to the example implementation.

Each filter can be associated with none, one or more events/time/geo-fence/GPS coordinates. FIG. 18 shows a spectrum with 4 LUT filters, each of them associated with an external value. One of the filters is associated to an event (e.g, the Super Bowl, which is a partner event in the US). Another filter is associated with Time Square, which is a Geo-Fence/GPS coordinate. Another filter is associated with a time or period of the calendar year (e.g., Christmas). Another filter may be associated with a partner brand (e.g., Disney), and defined as Geo-Fence/GPS coordinate.

If the user is in the USA during the week of SuperBowl, its position in the spectrum may be chosen to be near the SuperBowl filter. If the user is to filter a picture in late December, its position in the spectrum may be chosen to be near the filter associated to Christmas. If the user is located around Time Square in New York while filtering its picture, its location in the spectrum may be chosen to be close to the Time Square filter.

In this example use-case, the user is capturing a picture from Disney in Paris. Disney may be a partner having a filter associated to Geo-Fence (e.g., GPS coordinate+radius) around all their attraction parks. Thus, the position of the user inside the spectrum may be initially chosen to be nearby the Disney filter.

Figure 19:
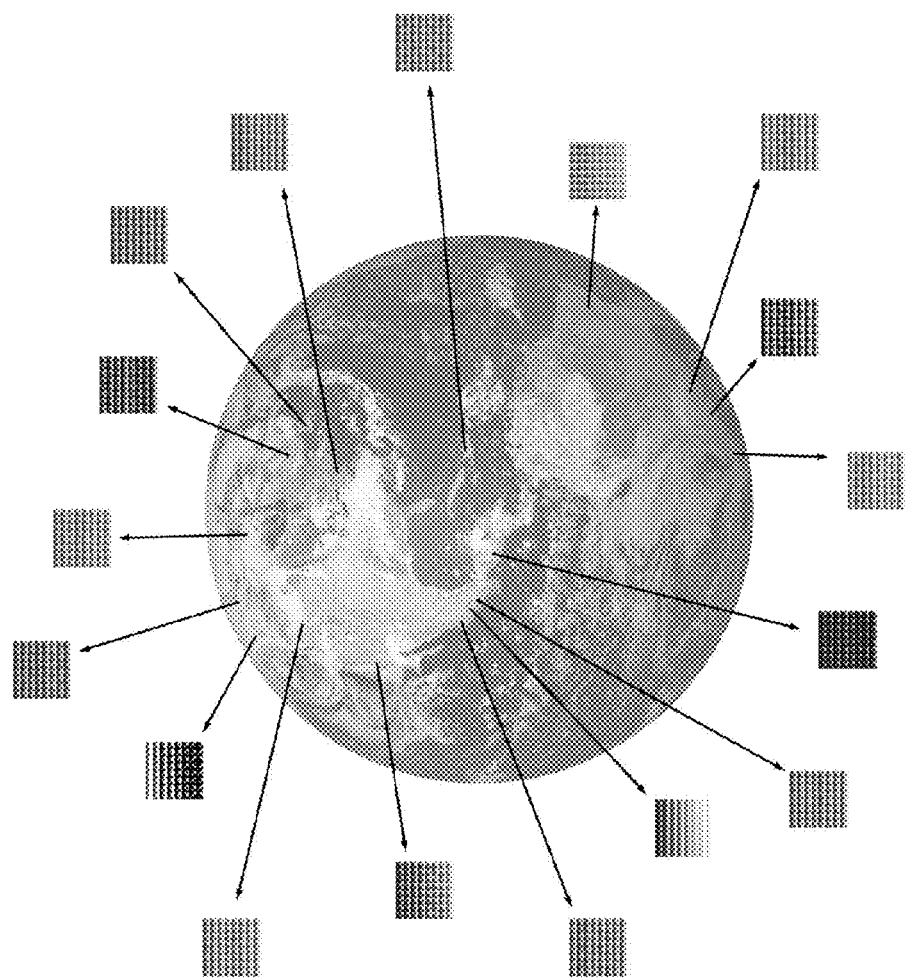
FIG. 19 illustrates a few filters mapped to locations in the world according to a simplified use case.

FIG. 19 illustrates a few filters mapped to locations in the world according to a simplified use case. In the actual implementation, additional data may be incorporated, such that illustration of FIG. 19 would be denser. In terms of the data-model, a GPS coordinate or Geo-Fence is associated with each filter in a database. If a filter is associated with a period of time (e.g., due to an event), a time interval is associated with the filter in the database. Both filters can be combined, an event such as the SuperBowl in the US would take a Geo-Fence to limit the filter to the event as well as a time interval for the week of the event. Such a system of geo-filter, time-filter may be managed by storage in a server online. Whenever the user launches the application, the application queries the server to determine whether there is any geo/time filter valid in the current context of the user. If so, the relevant filters can be downloaded and inserted in the current spectrum.

Figure 20:
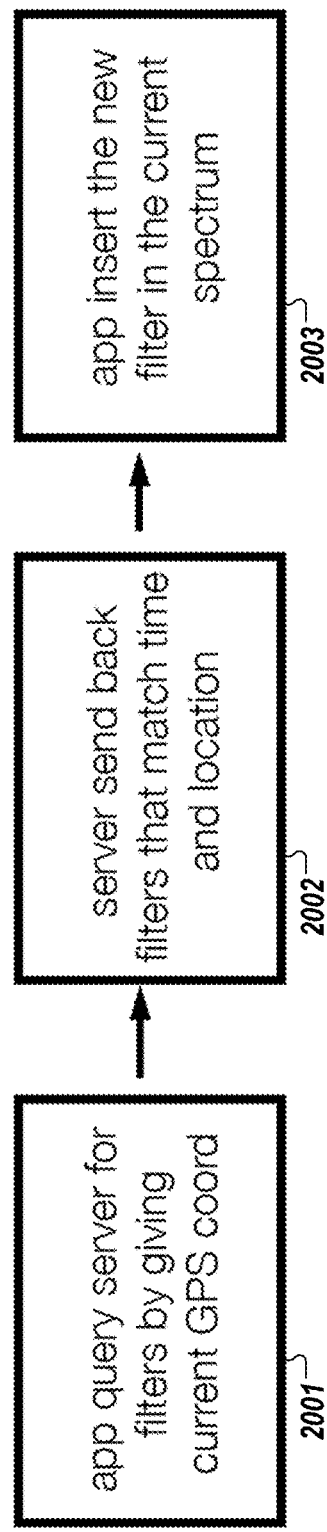
FIG. 20 illustrates an example of the application requesting filters from the server.

FIG. 20 illustrates an example of the application requesting filters from the server. At a first stage, the current filter parameters are calculated as follows. Once the position has been chosen, the current filter must be calculated. This step will be repeated each time the position inside the filter spectrum is changed.

More specifically, at 2001, the online application queries the server for filters, by providing current geo-fencing and/or GPS coordinates. At 2002, the server sends back filters that match the time and location that were provided by the online application in 2001. In 2003, then online application inserts the new filters that were received from the server in 2002, into the current spectrum.

In these examples, interpolation is used to calculate the current filter. However, and as explained above, other techniques may be substituted therefor without departing from the inventive scope.

Figure 21:
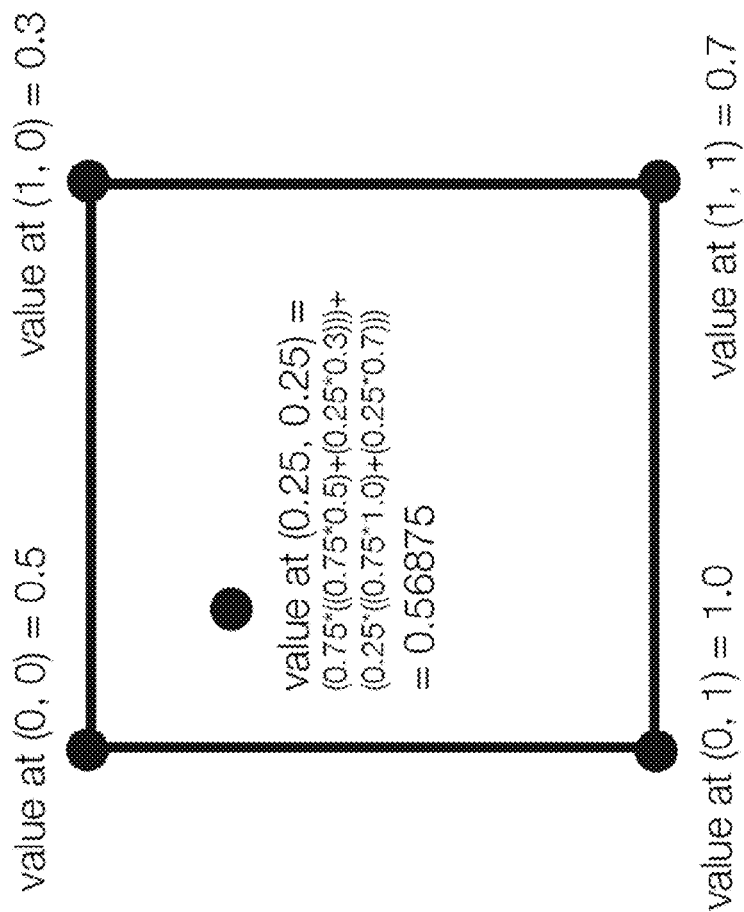
FIG. 21 shows how the value of the contrast is calculated inside the example spectrum using bi-linear interpolation according to an example implementation.
Figure 22:
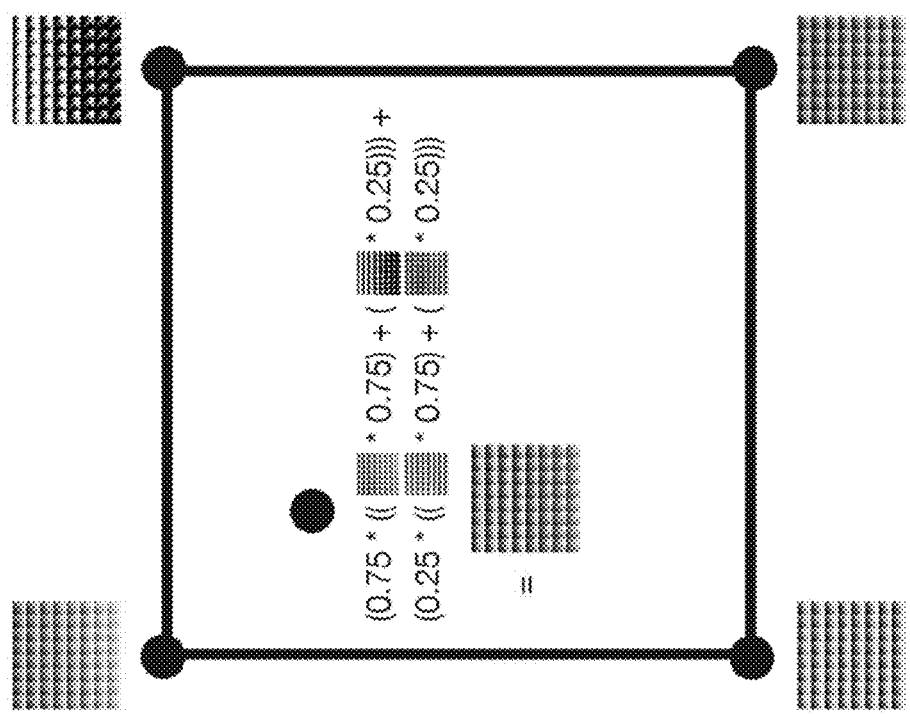
FIG. 22 illustrates an example process using the lookup tables spectrum.

FIG. 21 shows how the value of the contrast is calculated inside the example spectrum using bi-linear interpolation. FIG. 22 illustrates a similar process using the lookup tables spectrum.

If the objective is to render in real-time camera input and filter whatever the user will be looking at, the camera stream may be set at >=30 fps. Accordingly, calculating the filter should be done in real time. According to the example implementations, calculating the filter is not the same as applying the filter. Accordingly, interpolating the lookup tables must be done on the GPU on the mobile device, and can be done in parallel on several cores. On the related art mobile device, however, this could not be run in real-time if the interpolation of the 512×512×RGBA values of the lookup tables is computed on the CPU. For example, in the case of contrast, or vignette, this can be done on the CPU, as only 1 or 4 values needs to be interpolated.

Figure 23:
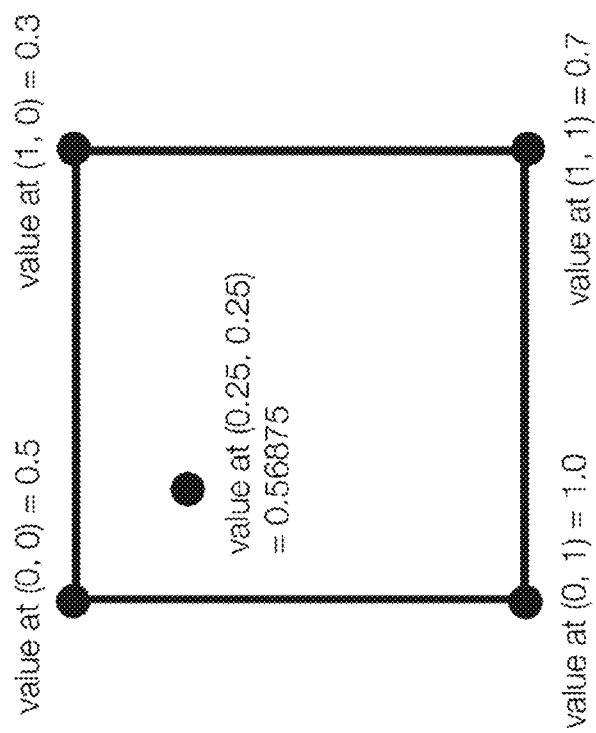
FIG. 23 shows the input/output of a contrast example implementation.
Figure 23:
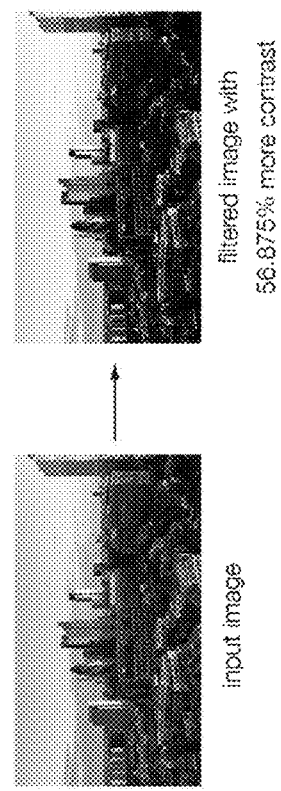

Next, the filter is applied. Here, the process involves applying the newly calculated filter to the input data which can be the stream of a camera, a photo/video/live-photo/animated-gif/image-sequence in a post-processing editor, live stream from a technology such as Web-RTC, the frames coming from a games. This process has to be done in real-time to allow the user to keep interacting with the spectrum, and change the position. To achieve real-time, the image processing will usually take place on the GPU, at least for the use-case of the related mobile application with the current operational limitations. FIG. 23 shows the input/output of the contrast example.

Further, the spectrum may be travelled, as explained above, and as exemplified below. When the position of the user inside the spectrum changes, the current filter needs to be re-calculated and then re-apply to the next frame. Travelling the spectrum can be done in many ways, including but not limited to when the users is physically moving (e.g., changing GPS coordinates), or simply by the user panning the screen (e.g., by gesture with his or her finger). The X, Y displacement in pixels can be mapped from screen-space to spectrum-space.

Travelling the spectrum can be continuous to achieve seamless filter change, or discrete to drastically change the current filter. Both options can be used in conjunction with one another, and the filter can be travelled continuously by panning the screen of the phone while the position is drastically changed, such as when the user shakes the mobile device.

The user may accordingly decide to travel the spectrum to slightly alter the filter and tweak the filter to better suit the picture with respect to the user's goal and the aesthetic point of view. The user touches, pans the screen and receives instantaneous feedback, due to the real time nature of this spectrum and renderer.

On the mobile device, OpenGL ES may be used to perform image processing on the GPU on an operating system such as iOS, Android, or Windows to achieve real-time processing. This approach is a related art approach in the gaming industry. On the iOS operating system, Metal from iOS 9, which is Apple's new API, may be used to do GPU computation and allow even performance.

Figure 24:
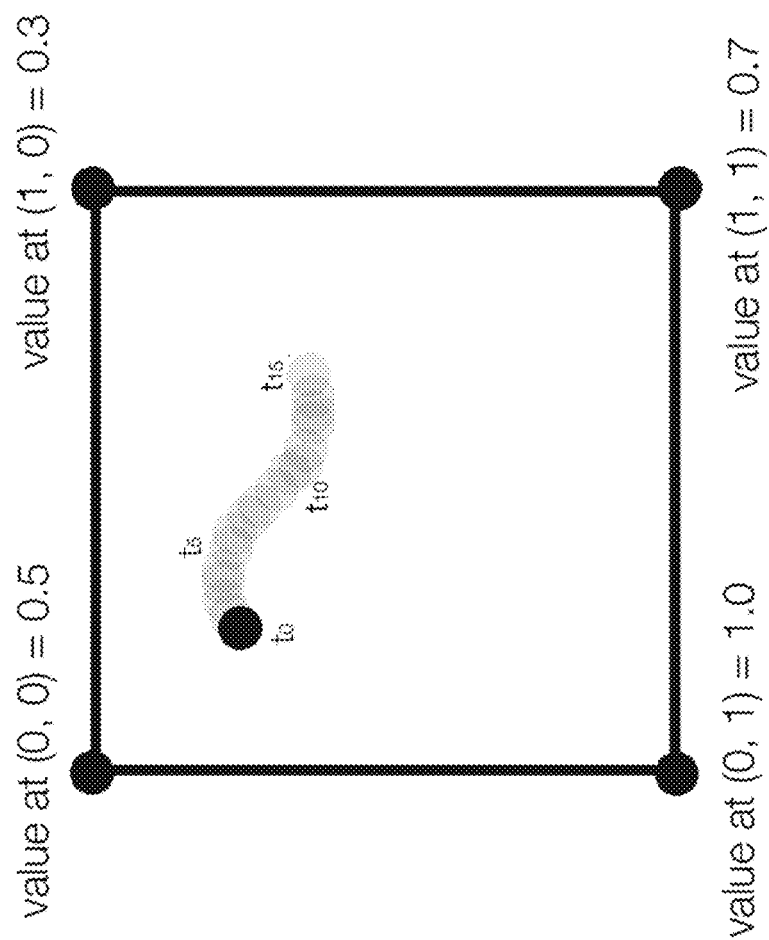
FIG. 24 illustrates continuous travel of the spectrum according to an example implementation.

FIG. 24 illustrates continuous travel of the spectrum. Whenever the user performs a gesture such as panning his or her finger on the screen, its position in the spectrum is slightly altered and follows the direction that the user is creating with the gesture. For example, if the user moves his or her finger too quickly, the input displacement might be filtered and smoothed to keep the filter alteration seamless for the eye. In this example, the filter is re-computed at each time t, 15 times in total to create a seamless transition. The user is in control to stop panning, such as when he or she is happy with the result shown in real time on the screen. Thus, the user is presented with a view of what he or she would be able to view when happy; in the context of a camera, the user can capture the picture with the current generate filter.

Figure 25:
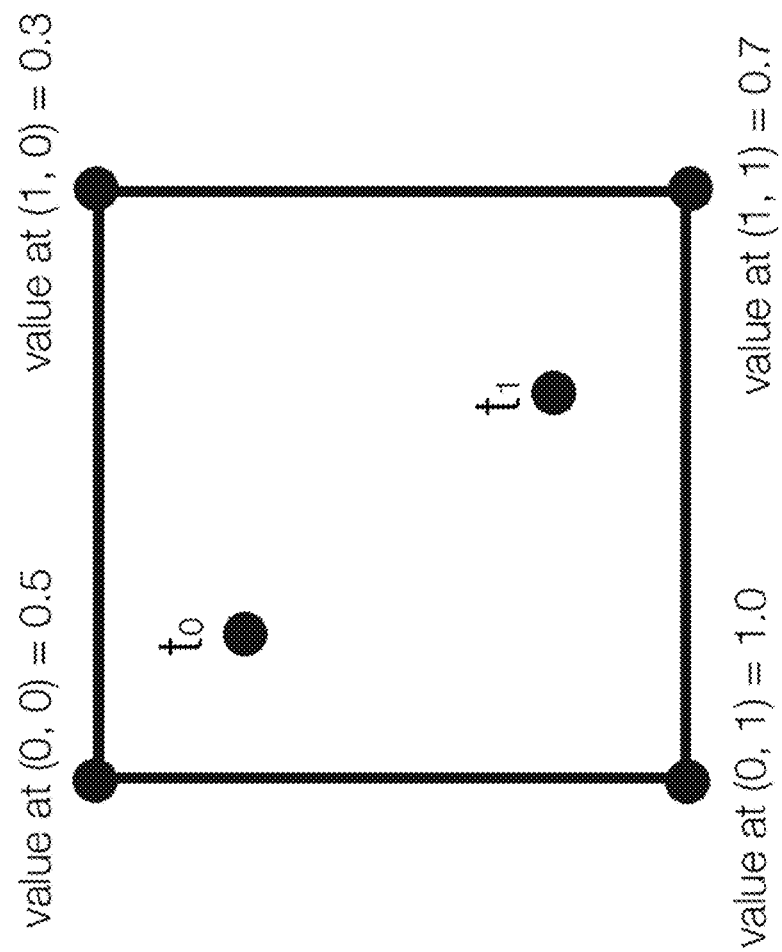
FIG. 25 illustrates a discrete, change of filter according to an example implementation.

FIG. 25 illustrates a discrete, change of filter that may be triggered by shaking the mobile device or double tapping on the screen. Sometimes, the user does not like the style of the current filter; by double-tapping the screen, the user may be able to completely change the filter. This change process may be done randomly, or input parameter may be provided that will determine the next position. For example, it may be assumed that the user does not like the current filter, and desires something completely different. It is possible to achieve this by having a metric that helps with comparing filters. For the LUT spectrum, this could be done using the sum of the difference of all values of two LUTs. In this example, the filter is only recomputed once.

Figure 26:
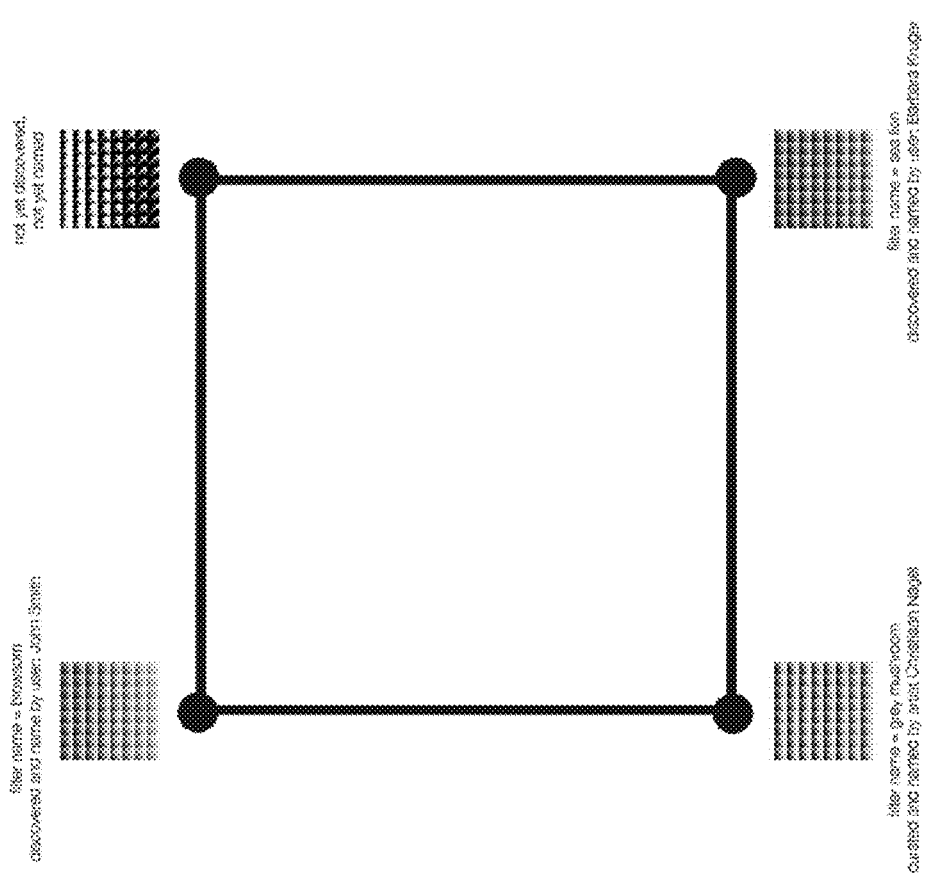
FIG. 26 illustrates how a filter can be created/curated by a partner user according to an example implementation

According to another example use case, naming and curation of the filter discovery may be provided. FIG. 26 illustrates how users can discover (e.g., name) a filter, and shows how a filter can be created/curated by a partner user, such as an artist. This can be simply done by associated information to the filter in the data-model. Usually, this would happen when the filter is stored online. This information can then be displayed whenever the user is travelling the spectrum and hitting a filter that has been named or belongs to someone else.

Useful statistic and analytics may be pulled from these filter that have association. For example, but not by way of limitation, it may be possible to let a user know how many people are using his or her filter which, can be a meaningful metric for users similar to a number of Likes (e.g., Instagram, Facebook.), or Views (e.g., YouTube).

Recording information about the filters requires a database online. While some information may be valuable to the users, other information might be valuable to partner or other business in the photography industry. By recording how many times a filter is being used, and extra anonymous information such as the location where it was used, it may be possible to come up with aggregate information such as: "what is the filter that has been used the most in the United State in July 2016", which you could say is "the best filter in the United State in July 2016". Such an approach may be valuable for online businesses (e.g., Apple or Instagram) which only have limited number of filters in their application, and may save them time and energy, if they wanted to add an extra filter to their application. The infinite filter spectrum may provide this information.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer implemented method, comprising:
receiving image or audio data;
generating a spatial filter spectrum that comprises a plurality of filters arranged in a prescribed geometry, wherein the spatial filter spectrum is mapped as an infinite spatial spectrum of filters based on at least one of volumetric spectrum not having a border, and seamless interpolation between spatial borders of the spatial filter spectrum;
receiving an input via an interaction device;
performing an operation on the spatial filter spectrum, based on the received input, to identify a new filter in the plurality of filters of the spatial filter spectrum; and
rendering an output of the image or audio data by applying the new filter to the image or audio data.

2. The computer implemented method of claim 1, wherein the spatial filter spectrum is configured to be navigated based on at least one parameter and at least one input.

3. The computer implemented method of claim 2, wherein the at least one input comprises a touchscreen of a user interface device.

4. The computer implemented method of claim 2, wherein the at least one parameter is provided by a user, via a user interface device that comprises at least one of an interaction touch device, an orientation device, a gyroscope, and an accelerometer.

5. The computer implemented method of claim 2, wherein the at least one parameter is controlled based on information associated with a user.

6. The computer implemented method of claim 5, wherein the information associated with the user comprises at least one of user location information, a biometric data input, and user activity information.

7. The computer implemented method of claim 2, wherein the at least one parameter comprises a parameter that is not controlled by the user.

8. The computer implemented method of claim 1, wherein at least one region of the spatial filter spectrum is configured to be identified and associated with a user.

9. A computer implemented method, comprising:
receiving image or audio data;
generating a spatial filter spectrum that comprises a plurality of filters arranged in a prescribed geometry, wherein the spatial filter spectrum is configured to be navigated based on at least one parameter and at least one input, wherein the at least one parameter is controlled based on information associated with a user, wherein the information associated with the user comprises at least one of user location information, a biometric data input, and user activity information, and wherein the user location information comprises at least one of a Global Positioning System (GPS) coordinate and geo-fence information;
receiving the at least one input via an interaction device;

performing an operation on the spatial filter spectrum, based on the received input, to identify a new filter in the plurality of filters of the spatial filter spectrum; and rendering an output of the image or audio data by applying the new filter to the image or audio data.

10. A computer implemented method comprising:

receiving image or audio data;

generating a spatial filter spectrum that comprises a plurality of filters arranged in a prescribed geometry, wherein the spatial filter spectrum is configured to be navigated based on at least one parameter and at least one input, wherein the at least one parameter comprises a parameter that is not controller by the user, and wherein the parameter that is not controlled by the user comprises at least one of a time of day, a weather condition parameter, a season of the year, a month of the year, a prescribed calendar event and a financial parameter;

receiving the at least one input via an interaction device;

performing an operation on the spatial filter spectrum, based on the received input, to identify a new filter in the plurality of filters of the spatial filter spectrum; and rendering an output of the image or audio data by applying the new filter to the image or audio data.

11. A computer implemented method, comprising:

receiving image or audio data;

generating a spatial filter spectrum that comprises a plurality of filters arranged in a prescribed geometry, wherein at least one region of the spatial filter spectrum is configured to be identified and associated with a user, and wherein the at least one region comprises a filter map based on Global Positioning System (GPS) coordinates of Earth;

receiving an input via an interaction device, wherein the input comprises the user moving to new GPS coordinates;

performing an operation on the spatial filter spectrum, based on the received input, to generate a new filter from the plurality of filters of the spatial filter spectrum; and rendering an output of the image or audio data by applying the new filter to the image or audio data.

12. The computer implemented method of claim 11, wherein if two users are on the same GPS coordinates or geo-fence, a common filter is generated for the two users.

13. A computer implemented method comprising:

receiving image or audio data;

generating a spatial filter spectrum that comprises a plurality of filters arranged in a prescribed geometry, wherein at least one region of the spatial filter spectrum is configured to be identified and associated with a user, and wherein a filter in the at least one region is associated with a first user to find the filter in the at least one region;

receiving an input via an interaction device;

performing an operation on the spatial filter spectrum, based on the received input, to identify a new filter in the plurality of filters of the spatial filter spectrum; and rendering an output of the image or audio data by applying the new filter to the image or audio data.

14. A computer implemented method comprising:

receiving image or audio data;

generating a spatial filter spectrum that comprises a plurality of filters arranged in a prescribed geometry, wherein ones of the plurality of filters in the spatial filter spectrum may be shared, owned, or acquired by one or more users or external organizations having access to the spatial filter spectrum;

receiving an input via an interaction device;

performing an operation on the spatial filter spectrum, based on the received input, to identify a new filter in the plurality of filters of the spatial filter spectrum; and rendering an output of the image or audio data by applying the new filter to the image or audio data.

15. A computer implemented method, comprising:

receiving image or audio data;

generating a spatial filter spectrum that comprises a plurality of filters arranged in a prescribed geometry;

receiving an input via an interaction device;

performing an operation on the spatial filter spectrum, based on the received input, to identify a new filter in the plurality of filters of the spatial filter spectrum; and rendering an output of the image or audio data by applying the new filter to the image or audio data, wherein a user may be provided with feedback comprising an audio signal based on the new filter applied in the performing.

16. A non-transitory computer readable medium for generating a new filter in a spatial filter spectrum, having instructions configured to be stored in a storage and processed by a processor, the instructions comprising:

receiving an input of image or audio data;

generating the spatial filter spectrum that comprises a plurality of filters arranged in a prescribed geometry, wherein the spatial filter spectrum is mapped as an infinite spatial spectrum of filters based on at least one of volumetric spectrum not having a border, and seamless interpolation between spatial borders of the spatial filter spectrum;

receiving an input via an interaction device;

performing an operation on the spatial filter spectrum based on the received input, to identify the new filter in the plurality of filters of the spatial filter spectrum; and rendering an output of the image or audio data by applying the new filter to the image or audio data.

17. A device configured to generate a new filter in a spatial filter spectrum, the device comprising:

a spectrum manager that generates the spatial filter spectrum, wherein the spatial filter spectrum comprises a plurality of filters arranged in a prescribed geometry;

a filter engine that generates the new filter based on information received via an interface, wherein the information comprises at least one of user-based information and not user based information; and a rendering and output manager that generates an output by applying data associated with an image to the new filter to generate a rendered output of the image.

18. The device of claim 17, wherein the filter engine operates in real time and prior to the generating of the output by the rendering and output manager, so that the new filter is generated prior to a user event of capturing the image.

19. The device of claim 17, wherein the prescribed geometry comprises at least one of a volumetric geometry that does not have a boundary, and a geometry that has the boundary and is subjected to a seamless interpolation operation.

20. The device of claim 17, wherein the spatial filter spectrum is stored online and the new filter is provided to a user via the internet.

* * * * *